United States Patent [19]
Wray

[11] 4,334,740
[45] Jun. 15, 1982

[54] RECEIVING SYSTEM HAVING PRE-SELECTED DIRECTIONAL RESPONSE

[75] Inventor: William R. Wray, Sudbury, Mass.

[73] Assignee: Polaroid Corporation, Cambridge, Mass.

[21] Appl. No.: 32,914

[22] Filed: Apr. 24, 1979

Related U.S. Application Data

[63] Continuation-in-part of Ser. No. 941,729, Sep. 12, 1978, abandoned, which is a continuation-in-part of Ser. No. 737,347, Nov. 1, 1976, abandoned.

[51] Int. Cl.³ .............................................. G03B 31/00
[52] U.S. Cl. ....................................... 352/11; 352/34; 179/1 DM; 179/1 P
[58] Field of Search ..................... 352/1, 5, 11, 25, 26, 352/34, 35, 242, 243, 244; 179/1 DM, 1 P; 328/163; 455/272, 273, 283, 296, 137–139

[56] References Cited

U.S. PATENT DOCUMENTS

| | | |
|---|---|---|
| 2,184,247 | 12/1939 | Baumzweiger . |
| 2,301,744 | 11/1942 | Olson . |
| 2,305,599 | 12/1942 | Bauer . |
| 2,396,222 | 3/1946 | Foldy . |
| 3,403,223 | 9/1968 | Kleis et al. . |
| 3,573,399 | 4/1971 | Schroeder et al. . |
| 3,876,947 | 4/1975 | Giraudon .................... 455/273 X |
| 3,881,177 | 4/1975 | Len et al. .................... 455/273 X |

OTHER PUBLICATIONS

"Product Probe:Sankyo XL-40S", Super 8 Filmaker, vol. 4, #1, 1976.
"Third Order Gradient Microphone for Speech Reception", Beavers and Brown.

Primary Examiner—L. T. Hix
Assistant Examiner—W. J. Brady
Attorney, Agent, or Firm—David R. Thornton

[57] ABSTRACT

A sound receiving system has an array of microphone elements for producing output signals in response to incident sound, and signal processing means for processing the output signals to provide the array with pre-selected directional acceptance and rejection characteristics. Such processing includes integrating the difference between the output signals of a pair of elements to produce an integrated signal, summing the outputs of the same or different pair of elements to obtain a sum signal, and combining the integrated signal with the sum signal.

The spatial position of pairs of elements and their orientation permit closely spaced pairs of elements to exhibit a single highly directional characteristic, or two angularly related highly directional characteristics. Thus, an array of microphone elements clustered at essentially a point location can exhibit either monaural or stereophonic characteristics, depending upon the type of signal processing applied to their outputs.

To minimize wind noise pickup, low frequency components of the integrated signal are suppressed to produce a filtered integrated signal, and high frequency components in the output signal of at least one of the elements are suppressed for producing a filtered output signal. The two filtered signals are added together to produce a resultant signal wherein only the higher frequency information signals will be directionally picked up and amplified.

60 Claims, 32 Drawing Figures

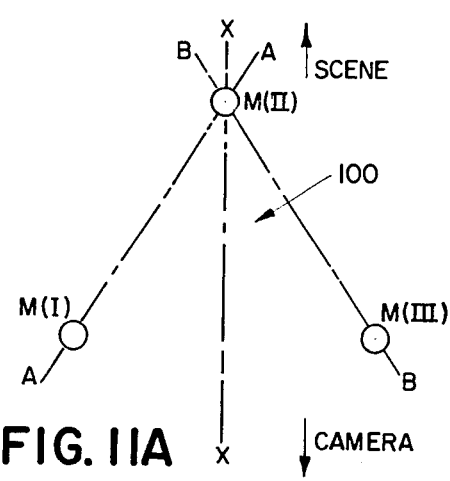
FIG. 11A
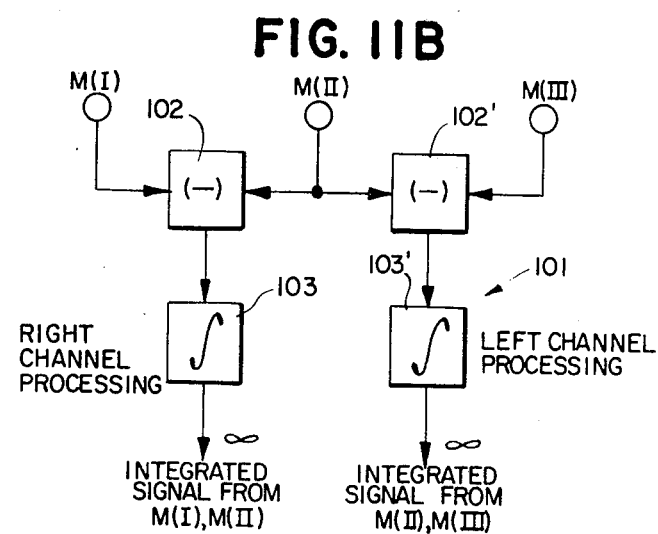
FIG. 11B
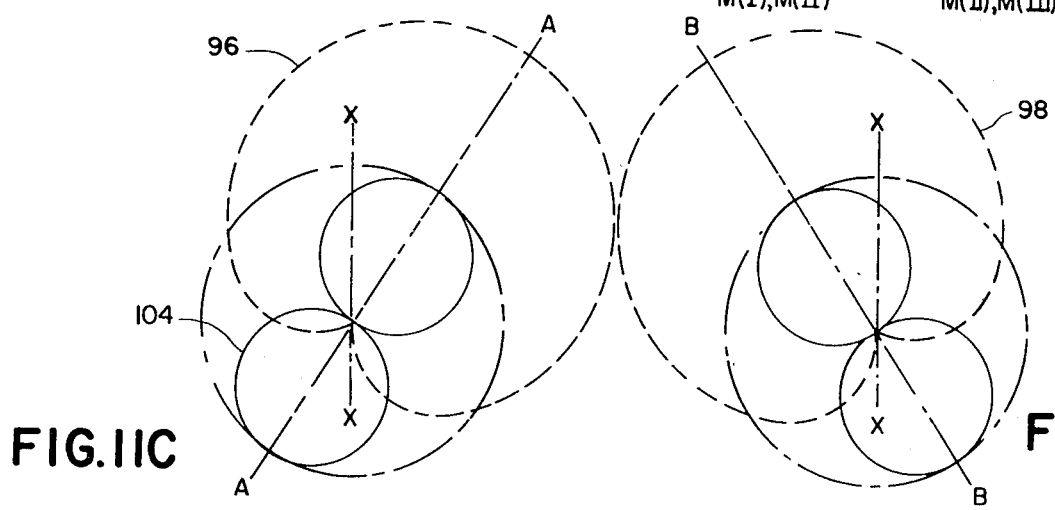
FIG. 11C
FIG. 11D
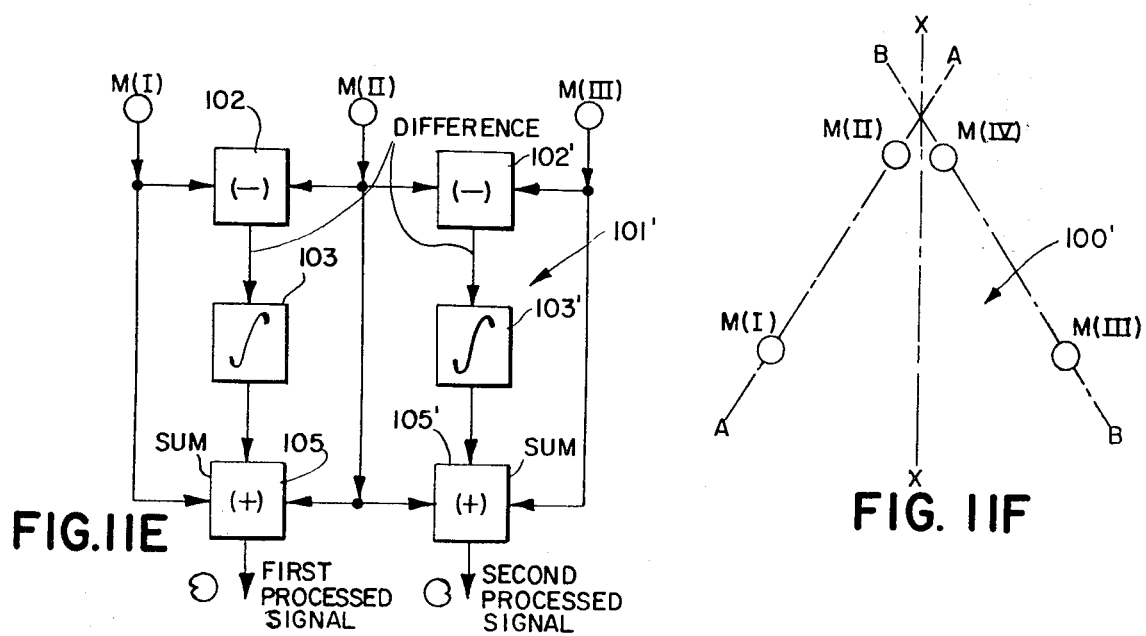
FIG. 11E
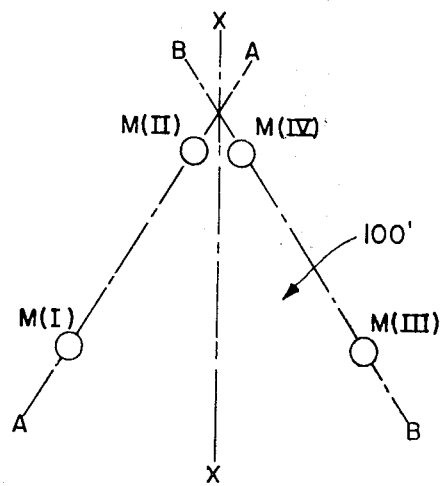
FIG. 11F

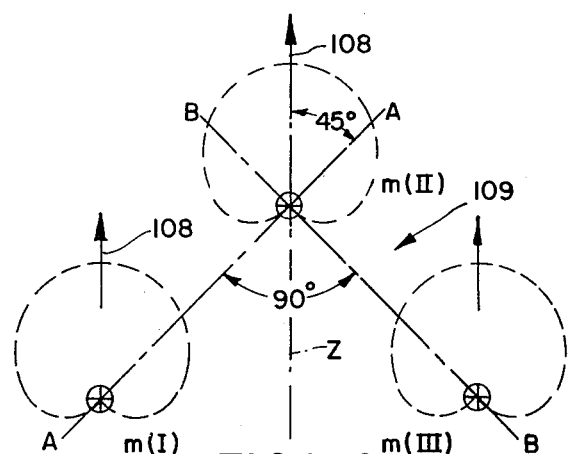
FIG. 12
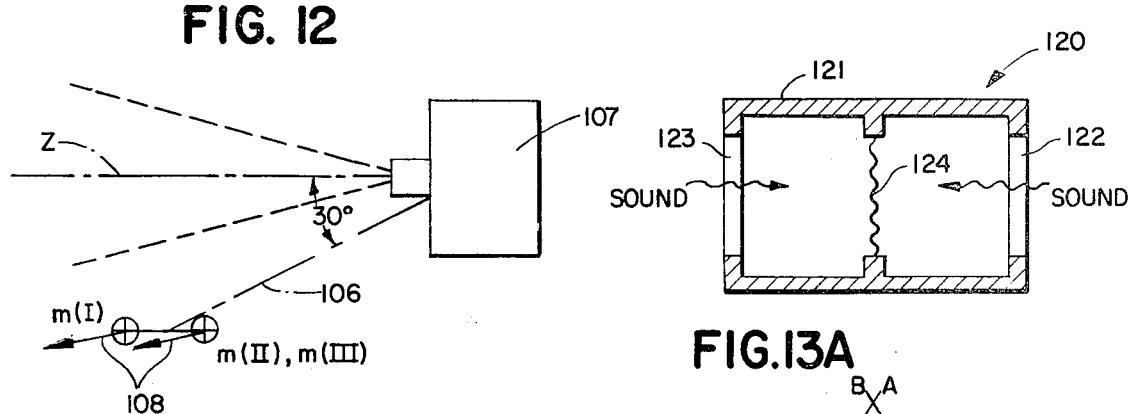
FIG. 13A
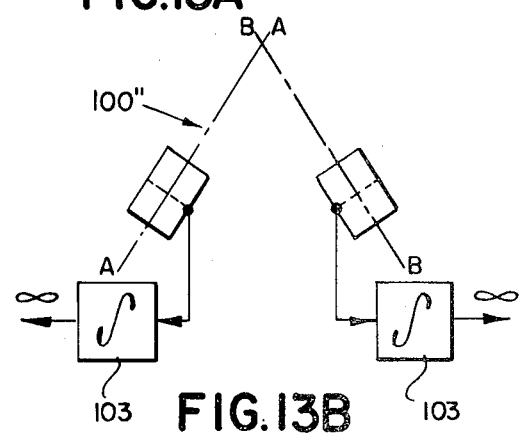
FIG. 13B
FIG. 14A
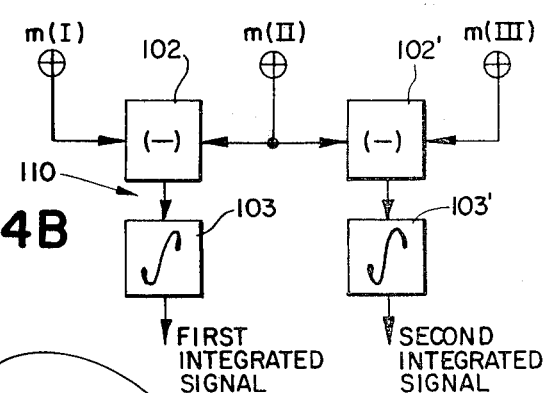
FIG. 14B
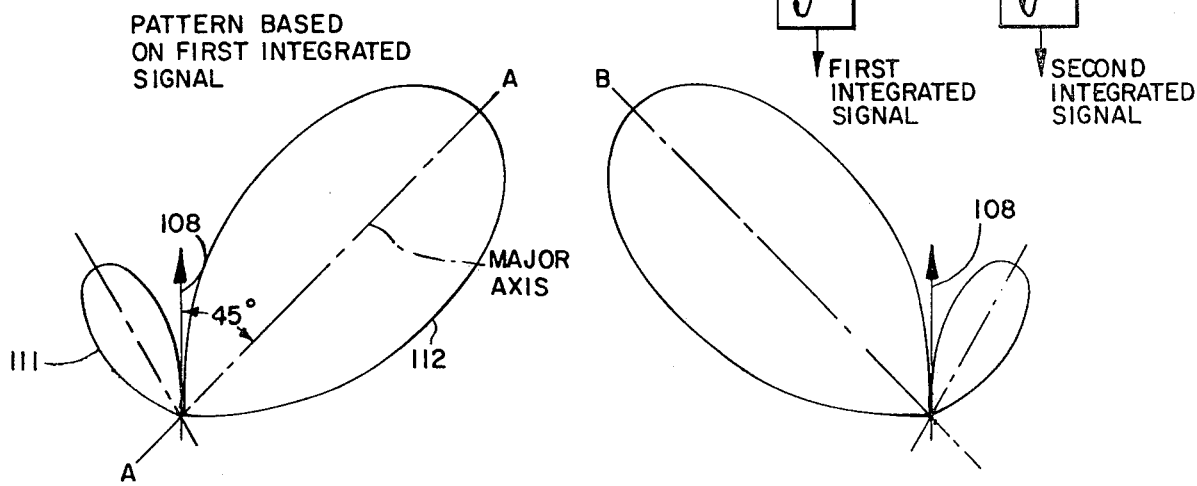
FIG. 14C  FIG. 14D

PATTERN BASED ON FIRST PROCESSED SIGNAL

PATTERN BASED ON FIRST PROCESSED SIGNAL

RECEIVING SYSTEM HAVING PRE-SELECTED DIRECTIONAL RESPONSE

BACKGROUND OF THE INVENTION

This application is a continuation-in-part of copending application Ser. No. 941,729 filed Sept. 12, 1978, which in turn is a continuation-in-part of application Ser. No. 737,347 filed Nov. 1, 1976 (now abandoned).

This invention relates to a receiving system having a preselected response pattern, and more particularly, to a receiving system utilizing a microphone array that permits monaural or stereophonic recordings to be made.

Amateur photographers who have made sound accompanied home movies with conventional equipment are familiar with the problem of minimizing camera sound pick-up during filming sequences. Failure to minimize camera sound pick-up is evident during projection of film in that the camera noise will frequently mask the sounds whose recording is desired in connection with the film.

One approach to solving this problem is to physically separate the microphone from the camera, but this requires an assistant to coordinate recording with picture taking. In many circumstances, this is inappropriate. Therefore, to permit simultaneous recording and picture taking by a single person, it is conventional to attach a microphone to the camera by way of an extension that positions the microphone forwardly of the camera in the direction in which photography takes place, but out of the field of view of the camera. For stereophonic recordings, two widely spaced microphones are conventionally required. For monaural sound recordings, an inexpensive cardioid microphone positioned on the camera and oriented so that the null of the cardioid faces the camera will normally be adequate for recording sounds associated with the scene being photographed. Unfortunately, the frequency spectrum of the noise associated with an operating camera is so wide, that a considerable amount of noise is also recorded. Experience shows that the spectrum of many cameras extend from a relatively low frequency of around 100 Hz to about 6,000 Hz with a peak occurring around 2,000 Hz just in the region of maximum hearing perception. While the usual inexpensive cardioid microphone is often adequate for rejecting low frequency sounds originating from the camera, its spatial pattern of response is frequency dependent over the relatively wide frequency range of sound usually associated with the mechanical drive of the camera. As a result, the sound of the camera in operation is superimposed on the recording of the sound associated with the scene being filmed. Being much closer to the microphone than the subject, it has been found that the camera noise dominates.

While it may be possible to design a special microphone whose mechanical arrangement increases the capability of rejecting noise from a camera over a relatively wide frequency band, such a microphone is likely to be highly complicated and hence expensive. It is therefore an object of the present invention to provide a new and improved recording system whose frequency response patterns are determined essentially by the type of signal processing utilized rather than by mechanical details of the elements of the microphone, thereby permitting a cluster of microphones to act as a highly directional monaural or stereo composite microphone.

SUMMARY OF THE INVENTION

The present invention provides a receiving system comprising an array of receiving members, each of which is responsive to incident time-variable stimuli for producing a corresponding time-variable output signal, and signal processing means to combine the output signals from the receiving members for causing the system to have a response pattern that depends on the type of signal processing and the spacing and orientation of the receiving members. The signal processing means includes an integration channel for integrating with time the difference between the output signals of a pair of the members to obtain an integrated signal. Optionally, the signal processing means includes a summing channel for adding the output signals of the same or different pair of the members to obtain a sum signal, and combining means for combining the outputs of the two channels.

For a stimulus of a given frequency incident on the array, the sum signal and the integrated signal will be in phase and will vary with time in accordance with the time variation of the incident stimulus. Consequently, the magnitudes of these signals can be made equal for that frequency and for a pre-selected angle of incidence by a proper selection of the gain applied to each of these signals before they are combined, and by a proper selection of the spacing of the receiving members of the array. Specifically, the relative gain of the gain controlled signals is selected such that upon addition, the result approaches zero for low frequency incident stimuli (i.e., stimuli at frequencies approaching zero) which make a predetermined angle with the axis of the array. Furthermore, the spacing between the pairs of receiving members may be selected so that the amplitudes of the gain controlled signals are also made equal for any given frequency for stimulus at the predetermined angle with respect to the array.

A pair of members which individually have omnidirectional receiving characteristics will exhibit a directional response in the form of a figure-eight when the output of the integrated channel associated with such pair is considered. When the output of the combining means is considered, however, the pair members will exhibit a more highly directional response of a cardioid. In each case, the direction of the major axis of the response characteristic will be aligned with a line interconnecting the pair of members.

Alternately, if each of the pair of members in the preceding arrangement has a directional and similar response, and the members are oriented in an array so that the major axes of the responses are perpendicular to the array axis, then the pair may be processed to exhibit a directional response whose major axis is rotated, for example, 45 degrees to the major axis of the individual members when the output of the integration channel is considered. The direction in which the major axis of the composite response is rotated will depend on the direction in which the subtraction process takes place.

The spatial position of pairs of microphones and the orientation of their individual directional responses relative to their spatial orientation permits closely spaced pairs of microphones to exhibit a single highly directional characteristic, or two highly directional angularly displaced characteristics. This versatility makes the recording system, according to the present invention, particularly well suited for incorporation into a sound motion picture system. In such case, the signal processing means may be arranged to cause the array of receiving members to act as a monaural cardioidal microphone at low frequencies with substantial rejection along the axis of the cardioid for the frequencies that dominate camera noise. Alternatively, the signal processing means can be designed to cause the array of members to act as a stereophonic microphone with adjustable separation between the two channels.

The invention also consists of a sound motion picture system comprising a motion picture camera and a sound recording system associated with the camera. Such system includes an array of microphones fixed to the camera and located out of the field of view thereof, the array preferably, but not necessarily, projecting forwardly and downwardly from the camera. Signal processing means are provided for combining the output signals of the microphones which are so spaced that the array preferentially accepts sound from a scene being photographed and rejects sound from the camera when it is operational. Specifically, the array can act as a monophonic or stereophonic microphone, depending on the spatial arrangement of the members of the array and on the type of signal processing employed. Low frequency sounds originating from the camera are significantly rejected, as are sounds originating at the camera at a frequency in the range within which hearing is most perceptive.

A monaural or stereophonic sound recording system according to the present invention is thus capable of utilizing relatively simple and inexpensive closely clustered microphones because the preselected directional characteristics, in terms of pickup and rejection, are essentially controlled by the signal processing means employed and the spatial location of the microphones.

To minimize wind noise pickup in a monaural or sterophonic system according to the present invention, low frequency components of an integrated signal produced by the system are suppressed to produce a filtered integrated signal, and high frequency components in the output signal of at least one of the elements are suppressed to produce a filtered output. When the filtered integrated signal is added to the filtered output signal, the low frequency components of the resultant signal essentially will be unprocessed, while the higher frequency components will be processed achieving the desired directional characteristics for these components. As a consequence, low frequency wind noises will be present in the resultant signal to an extent no greater than they would be present in a conventional recording system while higher frequency information signals will be directionally picked up. Lower frequency information signals will also be picked up from directions other than the preferred direction, but the reduction in wind noise more than balances this loss.

BRIEF DESCRIPTION OF THE DRAWINGS

Embodiments of the invention are shown in the accompanying drawings wherein:

FIGS. 11A-F are concerned with a stereophonic recording system utilizing a triangular array of omnidirectional microphones;

FIG. 12 is an elevational view of a sound camera system showing the relationship of an array of cardioid elements with each directed away from the camera;

FIGS. 13A-B illustrate an embodiment of a microphone which effectively provides a pair of microphones which achieve subtraction by means of the mechanical construction of the microphone.

FIGS. 14A-D are concerned with cardioidal microphones and circuitry therefore, which provides highly directional stereophonic receivers;

DESCRIPTION OF THE PREFERRED EMBODIMENTS

Figure 1:
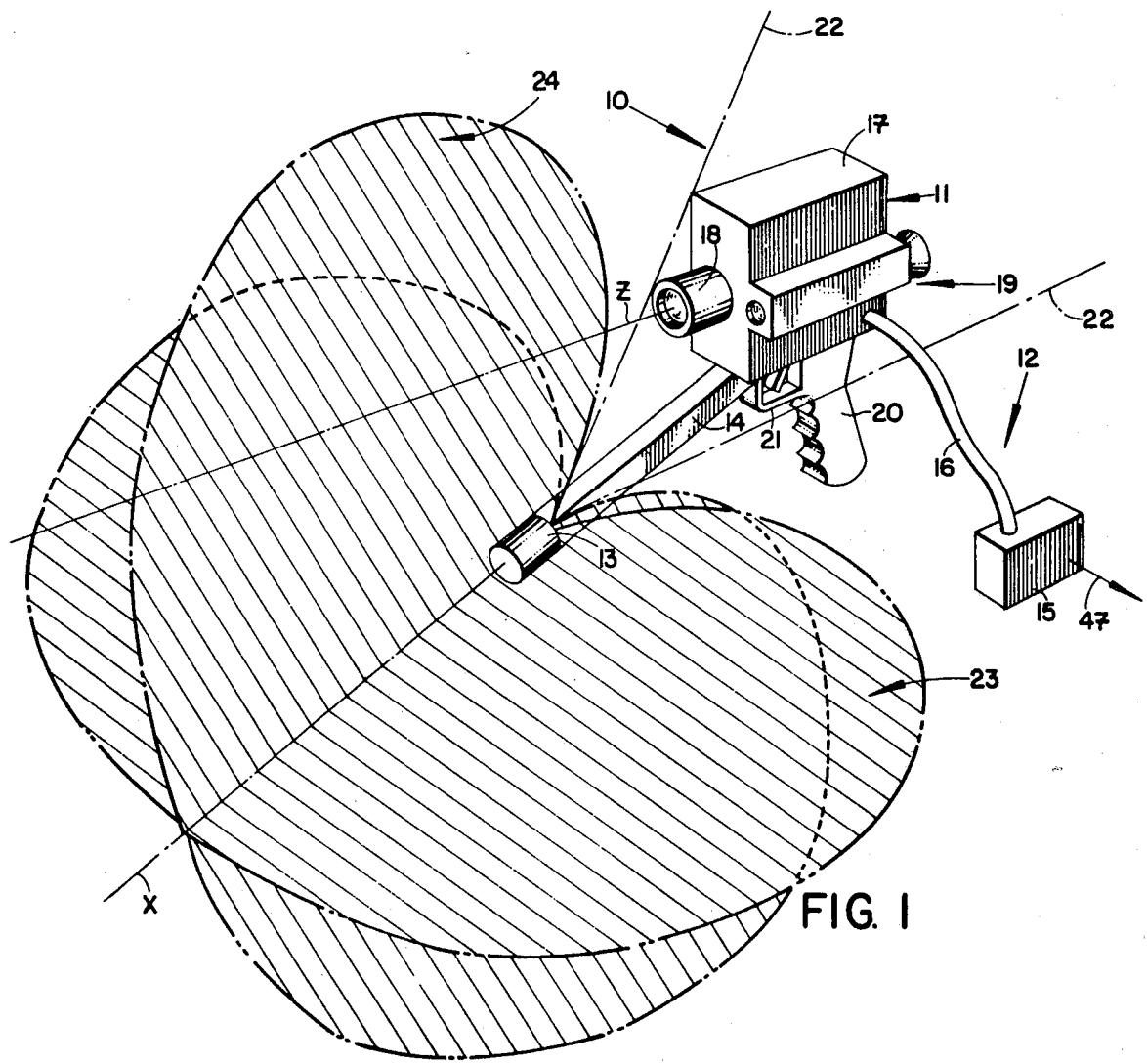
FIG. 1 is a perspective view of a motion picture camera into which a monaural version of the present invention is incorporated and showing orthogonal, low frequency cardioidal response characteristics of the sound recording system.

Referring now to FIG. 1, reference numeral 10 designates a sound motion picture system according to the present invention comprising a motion picture camera 11 and a sound recording system 12 associated with the camera. System 12 comprises a linear array of microphone elements (not shown), collectively referred to as a microphone and designated by reference numeral 13, secured in fixed position to the camera 11 by boom 14, and signal processing means 15 connected to the camera by cable 16. Camera 11 includes a conventional housing 17 containing film, film drive means (not shown), and lens assembly 18 through which light from a scene being photographed passes onto the film contained within the camera housing.

Aligned with the optical axis Z of the lens system of the camera is a viewfinder system 19 through which an operator views the scene being filmed. In addition, the camera is provided with grip 20 allowing the operator, with one hand, to hold the camera and actuate the same by squeezing trigger switch 21 with one finger and, with the other hand, to steady the camera.

The linear array of microphone elements that constitute microphone 13 are aligned along the X-axis which is downwardly inclined at a small angle (e.g., 20°) to the optical axis Z and lies in a plane common to the Z-axis and grip 20. Microphone 13 thus projects forwardly and downwardly from the camera by reason of boom 14 and is out of the field of view of lens assembly 18.

In operation, an operator grasps grip 20 with one hand, steadies the camera with the other hand, and views the scene to be filmed through the viewfinder means 19. Squeezing the trigger causes the camera and the microphone to be actuated whereby the scene within the field of view of the viewfinder means is photographed, and sounds from the scene are synchronously recorded. By reason of the orientation of boom 14, microphone 13 is positioned to receive sound from the scene being photographed. As explained below, microphone 13 has a cardioidal-like response (multiplied by the response of each element). The spatial characteristics of the response, as a function of frequency, are determined in accordance with signal processing means 15. Essentially, microphone 13 rejects sound incident on the microphone within a predetermined rejection cone having a solid angle that comprehends camera 11 as suggested by chain-lines 22 of FIG. 1. The angularity of the X-axis relative to the Z-axis, and the distance of the microphone from the camera are factors that depend upon the solid angle of the rejection cone whose apex coincides with microphone 13, such solid angle depending upon the operation of signal processing means 15 and selectable within wide limits to accomodate a given scene.

FIG. 1 shows orthogonal response patterns 23 and 24, respectively, of the microphone showing the dependency of the response on the direction of incidence of sound, the patterns being symmetrical about the X-axis. The patterns are shown qualitatively, but are typical of microphone 13 over a band of frequencies of interest.

Figure 2:
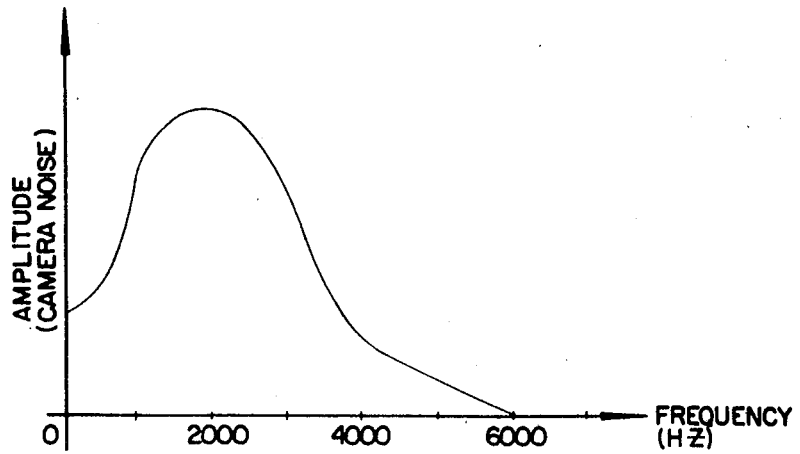
FIG. 2 is a qualitative showing of a typical noise spectrum associated with a movie camera.

FIG. 2 shows, in a qualitative way, the frequency distribution of noise associated with a typical movie camera. It has been found that noise associated with operation of the camera has very low frequency components, and a significant peak around 2000 Hz, which is within the range most perceptible by the human ear. The higher frequency components of noise associated with the operation of the camera typically decrease about 6,000 Hz. By reason of the operation of signal processing means 15, the response characteristic of microphone 13 can be adjusted to preferentially reject noise emanating from the camera throughout a relatively wide band of frequencies with particular emphasis on rejection around 2000 Hz.

Figure 3:
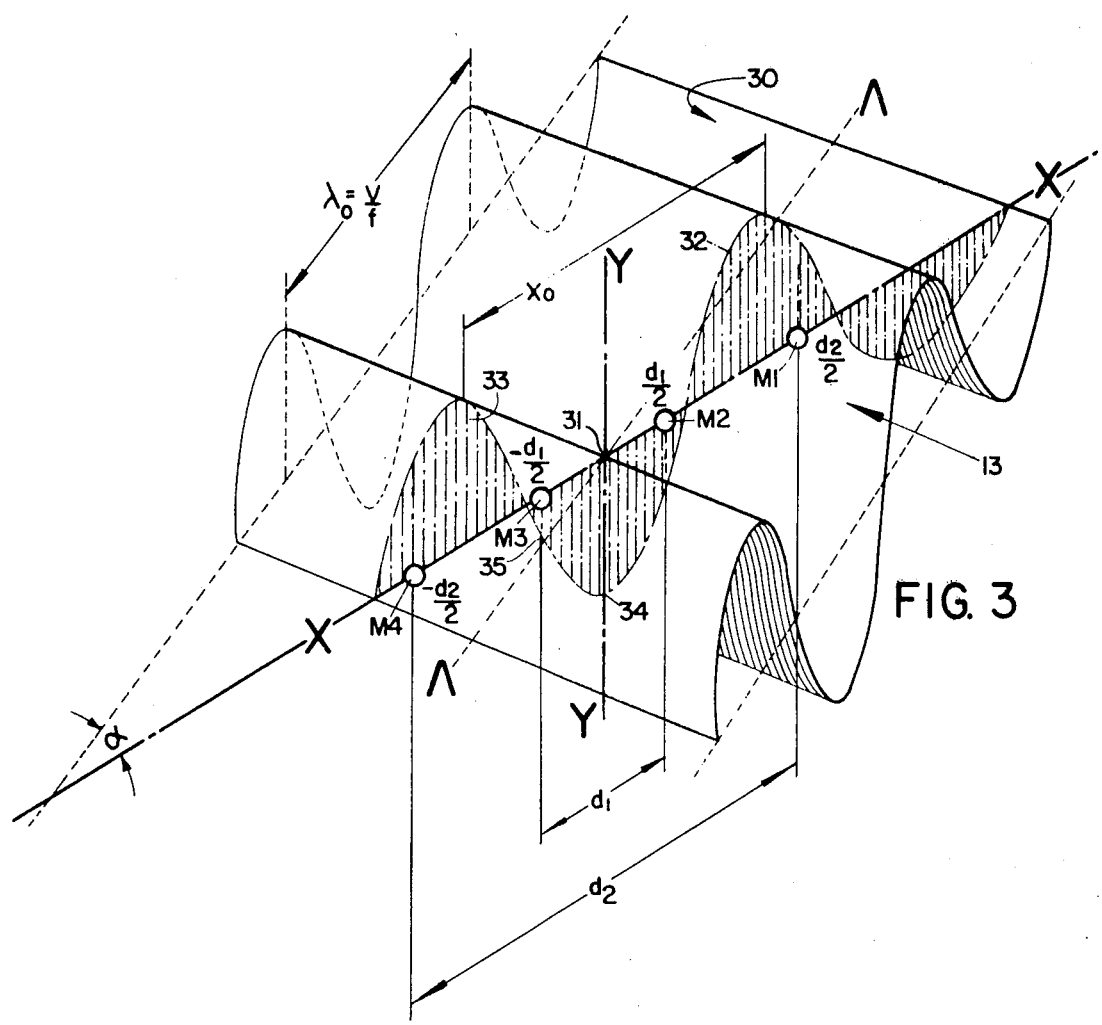
FIG. 3 is a perspective view of a linear array of receiving members showing the incidence thereon of a plane wave of arbitrary frequency and making an arbitrary angle of incidence with the array.

In order to explain the manner in which the signal processing means of the present invention preferentially modifies the rejection characteristics of microphone 13, reference is made to FIG. 3 which shows the interaction between plane sound wave 30 and a linear array of four microphone elements (e.g. omnidirectional microphones) M1, M2, M3 and M4 which, collectively, constitute microphone 13. The microphone elements are shown uniformly spaced along the X-axis to facilitate the analysis that follows, but the spacing need not be uniform. The intermediate pair of elements M2 and M3 are spaced apart a distance $d_1$, and the outer pair of elements M1 and M4 are spaced apart a distance $d_2$. For purposes of simplifying the analysis, it is assumed that the space between elements M1 and M2 is the same as the space between elements M3 and M4. The sinusoidal plane sound wave 30 has a frequency $\omega$, and is incident on the array of elements. The direction of propagation of the wave is generally from the positive X-axis and along the $\Lambda$-axis which makes an angle $\alpha$ with the X-axis, intersecting the same at the point 31, midway between elements M2, M3. Because the plane wave varies with time, FIG. 3 shows the position of the wave at an instant in time. The amplitude of the wave at this instant along the X-axis is shown by the chain line 32 which is defined by the intersection of a plane containing the Y-axis passing through the X-axis and being perpendicular to the plane defined by the $\Lambda$- and X-axes. The Y-axis passes through point 31. The amplitude of wave 32 at any instant, with respect to a point on the X-axis, is a measure of the instantaneous sound amplitude at that point.

The distance between corresponding points on the plane wave, as measured along the $\Lambda$-axis, is related to the distance between these points as measured along the X-axis by the cosine of $\alpha$, the angle of incidence of the plane wave. Designating the wavelength of wave 30 along the $\Lambda$-axis as $\lambda_o$, the wavelength $x_o$ along the wave in plane 33 defined by the X-Y axes, is related to $\lambda_o$ as follows:

$$\lambda_0 = \frac{V}{f} = x_0 \cos\alpha \quad (1)$$

where V is the speed of propagation of the plane wave, and $f = \omega/2\pi$. The speed of sound at 20° C. at sea-level is 13,548 inches per second.

The period $T_0$ of the plane wave is as follows:

$$T_0 = \frac{\lambda_0}{V} = \frac{x_0}{V} \cos\alpha \quad (2)$$

From equation (2), it can be seen that time $\tau_1$ for point 34 on wave 30, whose projection on the X-axis is the point 31 midway between elements M2 and M3, to move to point 35, whose projection on the X-axis is a distance $(\frac{1}{2})d_1$ from point 31 where element M3 is located is as follows:

$$\tau_1 = \frac{d_1}{2V} \cos\alpha \qquad (3)$$

The time for the point 34 on the plane wave to reach microphone M4 is:

$$\tau_2 = \frac{d_2}{2V} \cos\alpha \qquad (4)$$

With equations (3) and (4) in mind, it can be seen that an assumption of the analytical form of the wave at point 31 will yield the analytical expression for the wave at the four locations of the microphone elements in terms of phase differences with respect to the assumed form of the wave. If it is assumed that the wave at point 31 has the form $\sin(\omega t - \tau_o)$, then the wave at each of the four elements will be given as follows:

At M1: $\sin \omega(t - \tau_o + \tau_2)$ (5A)

At M2: $\sin \omega(t - \tau_o + \tau_1)$ (5B)

At M3: $\sin \omega(t - \tau_o - \tau_1)$ (5C)

At M4: $\sin \omega(t - \tau_o - \tau_2)$ (5D)

where $\tau_o$ represents the time required for the wave to move through a quarter-wavelength along the $\Lambda$-axis (enabling the expressions that follow to be applicable to either a sine or cosine wave of unit amplitude). Because any complex wave can be synthesized by a Fourier sine or cosine series, the analysis that follows is of general applicability even though the equations refer to a single sinusoidal wave having an angular frequency of $\omega$.

Figure 4:
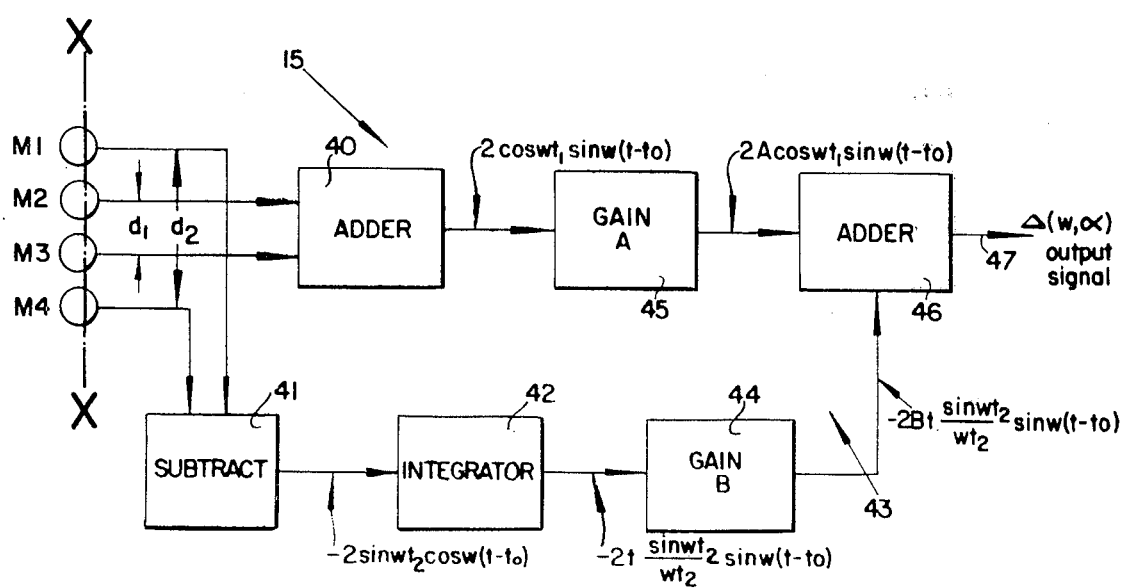
FIG. 4 is a block diagram of a receiving system according to the present invention showing details of one form of the signal processing means.

Reference is now made to FIG. 4 which shows details of the signal processing means 15. Each of the microphone elements M1 and M4 is responsive to an incident time-variable stimuli, such as a sound wave, for producing a corresponding time-variable output signal which is processed in accordance with the block diagram shown in FIG. 4. Specifically, means 15 includes, in addition to the microphone elements, summing channel 40 in the form of an adder for adding the output signals of the inner pair of microphone elements M2 and M3, and subtractor 41 for subtracting the output signals of the outer pair of microphone elements M1 and M4. The difference signal produced by subtractor 41 is integrated, with respect to time, in integrating channel 42 which is in the form of an integrator whose output is termed an integrated signal. Finally, means 15 includes combining means 43 for combining the outputs of the summing channel and the integrating channel. Specifically, combining means 43 includes a gain control means in each of the channels for setting the gain of one channel relative to the other to define a gain controlled integrated signal that appears at the output of amplifier 44 which has a gain B, and a gain controlled sum signal which appears at the output of amplifier 45 which has a gain A. Combining means 43 also includes means for adding the two gain controlled signals and is in the form of adder 46. The output of adder 46, which appears in line 47, constitutes the output of microphone 13.

Where the inputs to microphones M2 and M3 are as indicated in equation (5) above, the sum signal S appearing at the output of adder 40 is as follows:

$$S = [2 \cos \omega\tau_1] \sin \omega(t - \tau_o) \qquad (6)$$

while the difference signal D appearing at the output of subtractor 41 is as follows:

$$D = [-2 \sin \omega\tau_2] \cos \omega(t - \tau_o) \qquad (7)$$

This equation results from subtracting the signal of microphone M1 from the signal of microphone M4.

Integrating the difference signal in integrator 42 with respect to time yields an integrated signal I given as follows:

$$I = \left[ -\frac{2\sin\omega\tau_2}{\omega} \right] \sin\omega(t - \tau_o) \qquad (8)$$

After the sum and integrated signals are passed through amplifiers 45 and 44 respectively, it can be seen that each of the resultant gain controlled signals has the same phase allowing arithmetic addition of the amplitudes of the signals to take place. The amplitude of the gain controlled sum signal $A(\omega, \alpha)$ is given by:

$$A(\omega,\alpha) = 2A \cos\left( \omega \frac{d_1}{2V} \cos\alpha \right) \qquad (9)$$

while the magnitude of the gain controlled integrated signal $B(\omega, \alpha)$ is given by:

$$B(\omega,\alpha) = 2B \left( \frac{d_2}{2V} \cos\alpha \right) \left[ \frac{\sin\left( \frac{\omega d_2}{2V} \cos\alpha \right)}{\frac{\omega d_2}{2V} \cos\alpha} \right] \qquad (10)$$

The output of adder 46 is $\Delta(\omega, \alpha)$ and is given by:

$$\Delta(\omega, \alpha) = A(\omega, \alpha) - B(\omega, \alpha), \qquad (11)$$

$$\Delta(\omega,\alpha) = B \left[ 2 \frac{A}{B} \cos\left( \frac{\omega d_1}{2V} \cos\alpha \right) - 2 \left( \frac{d_2}{2V} \cos\alpha \right) \frac{\sin\left( \frac{\omega d_2}{2V} \cos\alpha \right)}{\frac{\omega d_2}{2V} \cos\alpha} \right] \qquad (12)$$

From inspection of equation (12), it can be seen that the output of adder 46 can be reduced to zero, indicating the complete rejection of the incident wave, at any desired frequency or angle of incidence of the incident wave on the array of microphone elements, by suitable selection of the relative gain A/B of the gain controlled signals and the spacing $d_1$, $d_2$ between the microphone elements. For low frequency incident waves where $\omega$ tends to zero, equation (12) reduces to:

$$\Delta(0,\alpha) = 2B\left[\frac{A}{B} - \frac{d_2}{2V}\cos\alpha\right] \quad (12A)$$

From inspection of equation (12A), it can be seen that the output of adder 46 will be zero when the expression contained within the square brackets in this equation is equal to zero. For a given angle of incidence $\alpha_o$, the relative gain A/B of the gain controlled signals to achieve complete rejection at low frequencies is given as follows:

$$\frac{A}{B} = \frac{d_2}{2V}\cos\alpha_0 \quad (12B)$$

Inserting the relative gain from equation (12B) into equation (12) provides the general expression for the output of adder 46 that insures rejection of low frequency waves incident on the array of microphone elements at an angle $\alpha_o$:

$$\Delta(\omega,\alpha) = 2B\left(\frac{d_2}{2V}\right)\left[\cos\alpha_0 \cos\left(\frac{\omega d_1}{2V}\cos\alpha\right) - \cos\alpha\frac{\sin\left(\frac{\omega d_2}{2V}\cos\alpha\right)}{\left(\frac{\omega d_2}{2V}\cos\alpha\right)}\right] \quad (13)$$

To reject low frequency sounds incident on the array at $\alpha_o = 0$, equation (13) reduces to:

$$\Delta(0,\alpha) = 2B\frac{d_2}{2V}(1 - \cos\alpha) \quad (13A)$$

Inspection of equation (13A) reveals the low frequency response of the composite microphone is cardioidal, with the axis of symmetry lying along the axis of the array (i.e., along the X-axis), and arises solely as a consequence of the processing of the signals from the elements of the array. The higher frequency response of the composite microphone for stimuli aligned with the array is obtained from equation (13) with $\alpha=0$:

$$\Delta(\omega,\alpha) = 2B\left(\frac{d_2}{2V}\right)\left[\cos\left(\frac{\omega d_1}{2V}\right) - \frac{\sin\left(\frac{\omega d_2}{2V}\right)}{\left(\frac{\omega d_2}{2V}\right)}\right] \quad (13B)$$

The spacing of the microphone elements from which the sum signal is derived, $d_1$ can also be selected to insure rejection of a wave at any frequency $\omega$ having an angle of incidence $\alpha_1$. The value of $d_1$ is obtained by setting the expression in the square brackets of equation (13) equal to zero and solving for $d_1$. This process yields the following:

$$d_1 = \frac{2V}{\omega\cos\alpha_1}\arccos\left[\frac{\sin\left(\frac{\omega d_2}{2V}\right)}{\left(\frac{\omega d_2}{2V}\right)}\right] \quad (14)$$

If $\alpha_1 = \alpha_2 = 0$, which is to say that rejection is achieved for waves of frequency $\omega$ approaching the linear array along the X-axis from the positive direction, equation (14) reduces to the following:

$$d_1 = \frac{2V}{\omega}\arccos\left[\frac{\sin\left(\frac{\omega d_2}{2V}\right)}{\left(\frac{\omega d_2}{2V}\right)}\right] \quad (14A)$$

Figure 5:
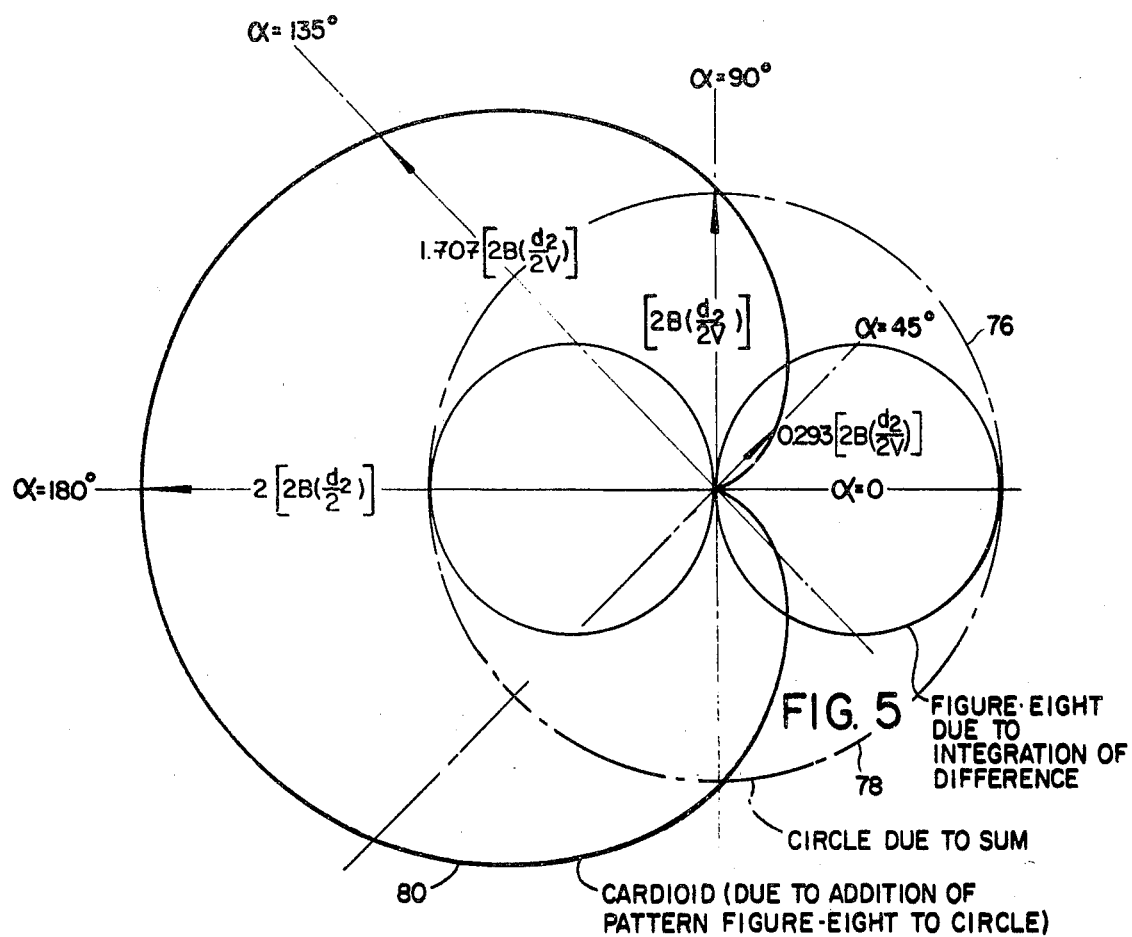
FIG. 5 is a polar-slot of the response characteristic of a receiving system according to the present invention for a particular value of relative gain as between the sum channel and the integrated channel for low frequency stimuli.

FIG. 5, which is a plot of equation (13A), is the response of an array of microphone elements to low frequency waves as a function of their angles of incidence on the array when the outputs of the elements are processed in accordance with FIG. 4. Thus, it is seen that a linear array of omni-directional receiving members in the form of microphone elements is converted into a composite microphone having a cardioidal response by reason of the signal processing that is carried out by means 15. If the elements themselves have cardioidal responses, the signal processing creates a higher order cardioidal response of the composite microphone.

Figure 6:
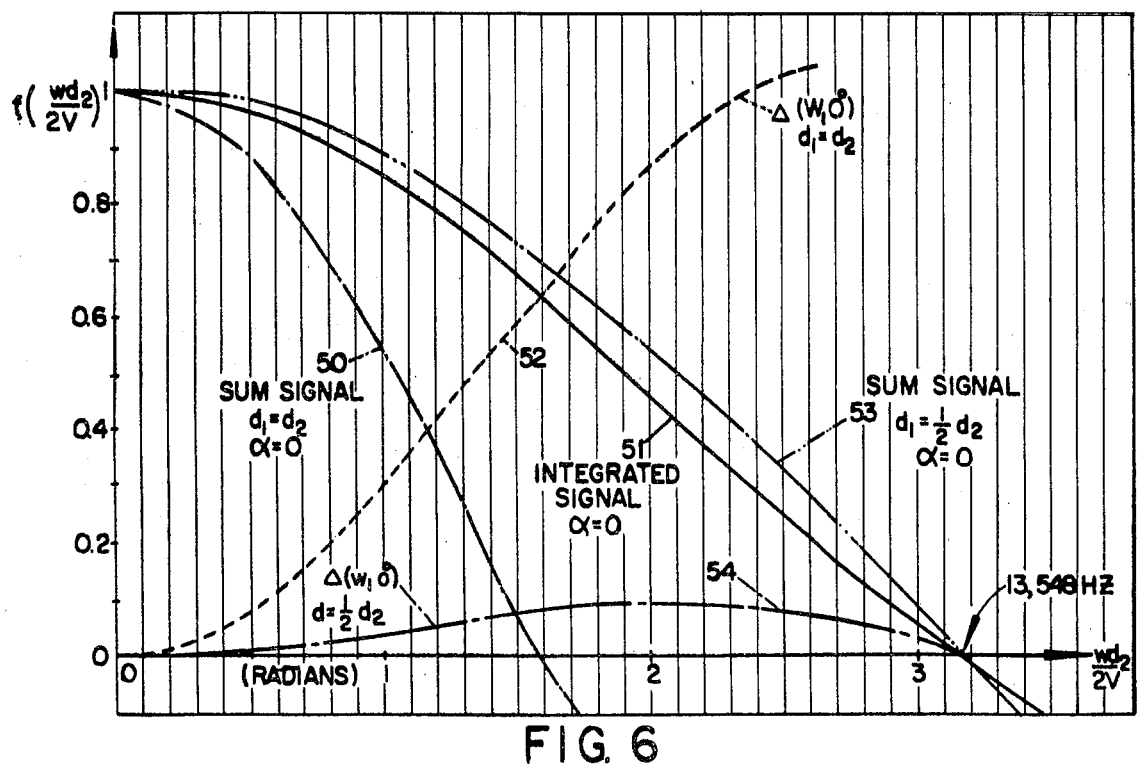
FIG. 6 is a composite plot of the respective amplitudes of the sum signal and the integrating signal for the system shown in FIG. 4, and showing the effect on the difference in magnitudes of the amplitudes of the sum and integrated channels for two situations, when the spacing between the pair of microphones whose output is subtracted is the same as, and is twice the spacing between the pair of microphones whose output is added for stimuli aligned with the incident on the array.

The response of an array of microphone elements to higher frequency waves incident on the array in alignment therewith (i.e., $\alpha = 0$) is shown in FIG. 6 which is based on equation (13B). Curve 50 represents the variation of cos $$\left(\frac{\omega d_1}{2V}\right)$$

with the parameter $$\left(\frac{\omega d_2}{2V}\right)$$

for $d_1 = d_2$ and is the gain controlled sum signal at the output of amplifier 45; and curve 51 represents the variation of $$\frac{\sin\left(\frac{\omega d_2}{2V}\right)}{\left(\frac{\omega d_2}{2V}\right)}$$

with the parameter $$\left(\frac{\omega d_2}{2V}\right)$$

and is the gain controlled integrated signal at the output of amplifier 43. It should be noted that when $d_1=d_2$, elements M1 and M2 merge and elements M3 and M4 merge creating a composite microphone of two, rather than four elements. Such a microphone has good low frequency rejection characteristics, but the ability of the microphone to reject higher frequency waves decreases markedly with frequency as indicated by curve 52 which is the difference between curves 50 and 51 and represents equation (13B) which is the output of adder 47.

For the condition that $d_1=\frac{1}{2} d_2$, elements M1-M4 are not equally spaced with the result that the microphone has four elements. Curve 53 represents cos $$\left(\frac{\omega d_1}{2V}\right)$$

for the condition indicated, and it is apparent that curve 53 approximates curve 51 rather closely. The difference between curves 51 and 53 is curve 54; and it is obvious that the use of four elements with $d_1=\frac{1}{2} d_2$ provides significantly improved rejection characteristics as compared with a two element microphone.

The frequency scale in FIG. 6 has been selected by choosing $d_2=1''$ so that both curves 51 and 53 are zero at $$\frac{\omega d_2}{2V} = 13{,}548 Hz.$$

A further improvement in rejection of waves aligned with the array and in the band up to 6000 Hz, which is the noise band of a camera, is possible by suitable choice of the ratio of $d_1$ to $d_2$. Presently, it is preferred to select $d_1$ such that the amplitude of the gain controlled sum signal (i.e., the frequency of the cosine curve) equals the gain controlled integrated signal (i.e., the sinc curve) at a frequency of about 59% where the gain controlled integrated signal goes to zero. For $d_2=1''$, the equality occurs at 8000 Hz; and from equation (14A), $d_1=0.55''$.

Figure 7:
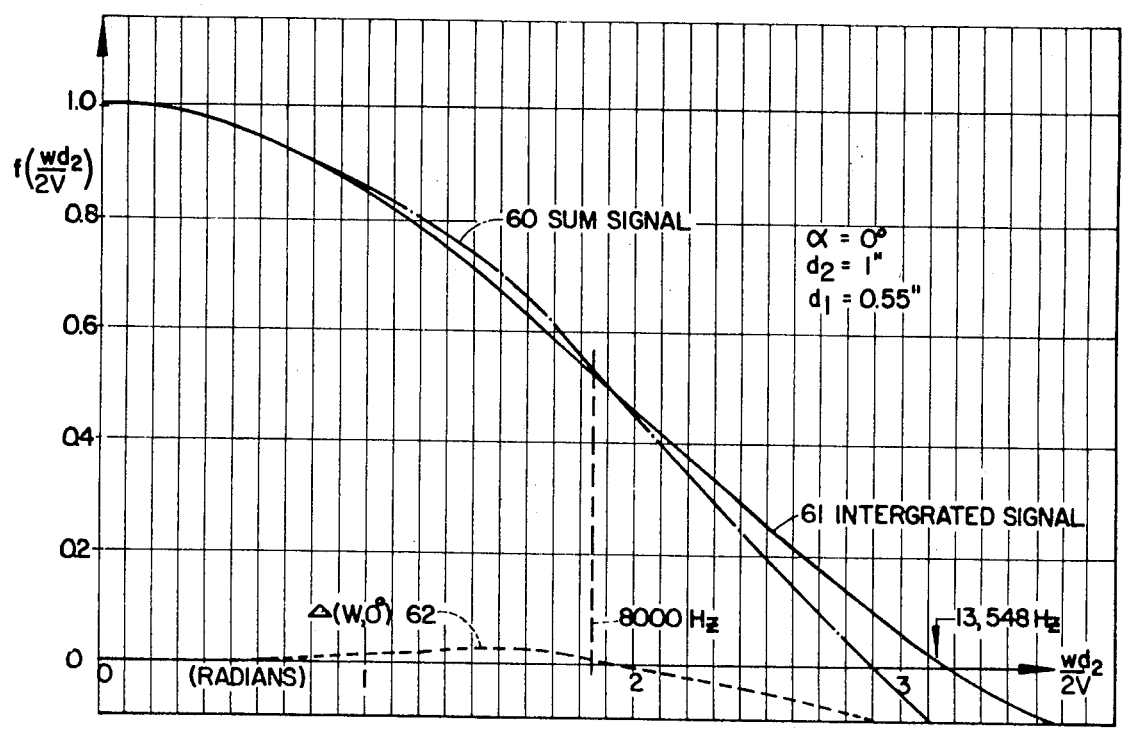
FIG. 7 is a plot similar to that shown in FIG. 6 except the spacing between the pairs of microphones has been selected so that the difference in magnitudes of the amplitudes of the sum and integrated channels is made zero for stimuli of a predetermined, non-zero frequency, incident on and aligned with the array.

Curve 60 in FIG. 7 represents the gain controlled sum signal under these conditions, and curve 61 represents the gain controlled integrated signal which equal each other at 8000 Hz. At frequencies less than this, the rejection is extremely good as shown by curve 62 which is the difference between curves 60 and 61 and represents the output 47 of adder 46.

Figure 8:
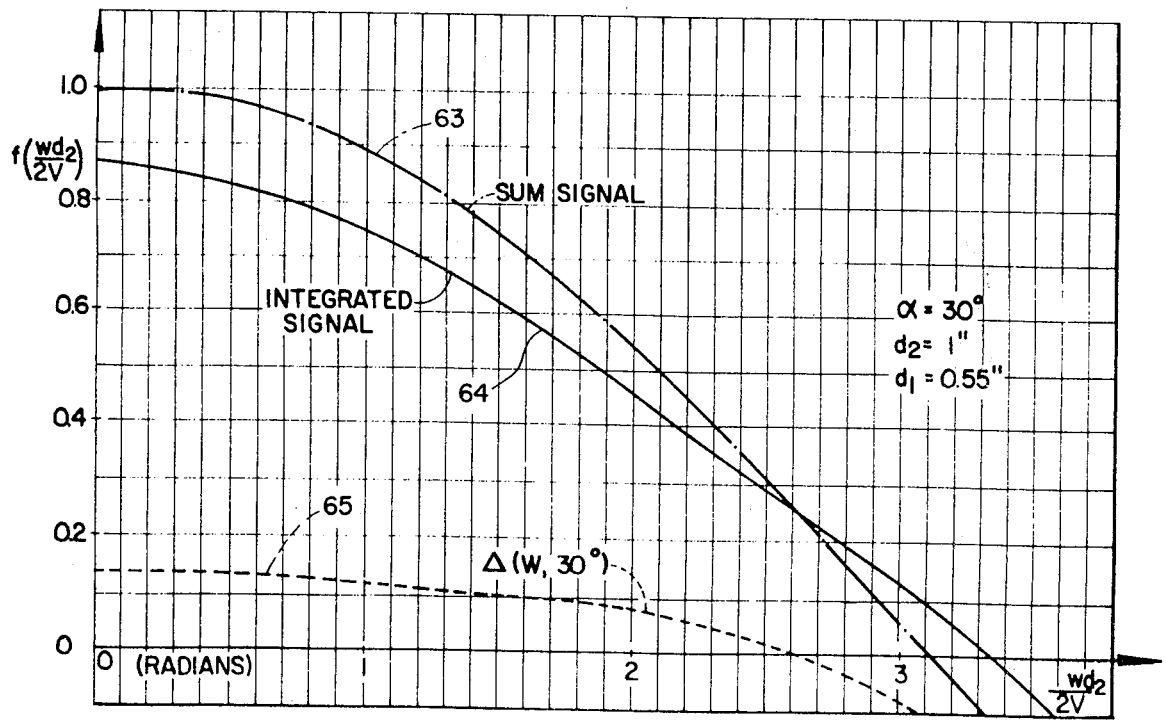
FIG. 8 is a plot similar to FIG. 7 but showing the amplitudes of the sum and integrating signals for stimuli incident on the array at an angle of approximately 30°.
Figure 9:
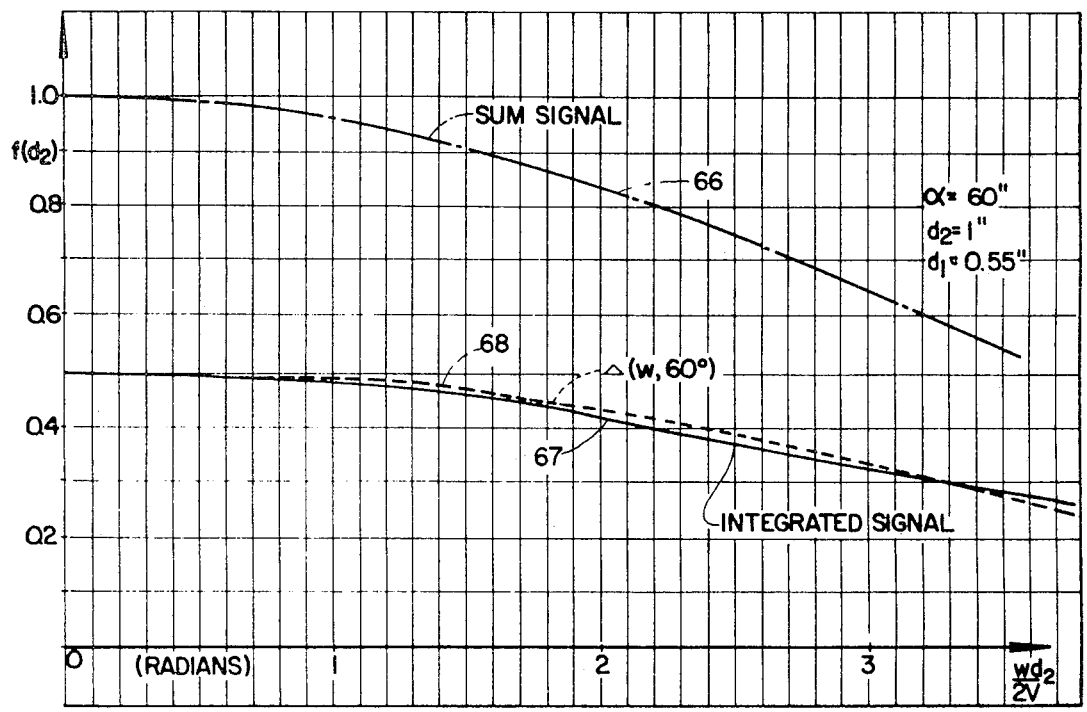
FIG. 9 is a plot similar to FIG. 8 but showing the situation when the stimuli is incident on the array at an angle of about 60°.

The curves shown in FIG. 7 are applicable to input waves aligned with the array. FIGS. 8 and 9 show the rejection at angles of incidence of 30° and 60° respectively. In FIG. 8, curve 63 represents the gain controlled sum signal for $\alpha=30°$, and curve 64 represents the gain controlled integrated signal. Curve 65 represents the difference between curves 63 and 64. In FIG. 9, curve 66 represents the gain controlled sum signal for $\alpha=60°$, and curve 67 represents the gain controlled integrated signal. Curve 68 represents the difference between curves 66 and 67. It is evident, that the selection of $d_1=0.55$ inches and $d_2=1$ inch provides extremely good rejection at $\alpha=0°$ and through $\alpha=30°$ (which corresponds to a rejection cone whose apical angle is 60°).

In this arrangement, if the microphone M1, at the scene end of the array, is subtracted from the microphone M4, closest to the camera, the array rejects sound proceeding in a direction from the first (M4) to the second (M1) microphone. This assumes that a non-inverting integration is employed. If an inverting integration is employed, the pattern direction is reversed. Further, as later discussed in detail with regard to FIG. 15A, the array can simultaneously provide two patterns, each looking in opposite directions.

Other rejection patterns can be created by suitable selection of relative gain between the sum and integrated channels, and the relative distances between the sum and difference pairs of elements. Furthermore, other analytical solutions are available when the spacing of the elements is not uniform.

While the above description refers to sound waves and microphones, it is clear that the present invention is applicable to other stimuli to which elements respond by producing output signals. For example, the invention is applicable to radio waves and receiving antennae.

Figure 10:
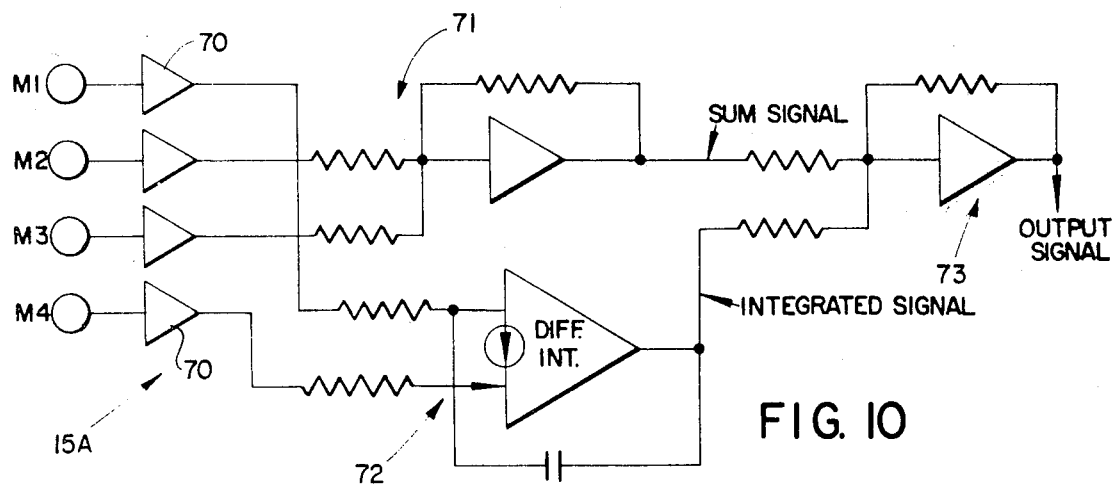
FIG. 10 is a block diagram of signal processing equipment suitable for carrying out the signal processing technique of the present invention as it is applied to a two-microphone version of the present invention.

FIG. 10 is a circuit diagram for signal processing means according to the present invention for effecting a desired signal rejection characteristic. Means 15A includes four microphone elements M1-M4 and a preamplifier 70 associated with each element. The preamplified output signals from elements M2 and M3 are added in analog adder 71 to develop the sum signal. The pre-amplified signals from elements M1 and M4 are subtracted and integrated in Norton difference integrator 72, the output of which is the integrated signal. The sum and integrated signal are added in analog adder 73 to provide the output signal.

The invention described above is concerned with a linear array of microphones, and signal processing of the output of these microphones in such a way as to achieve a cardioidal composite microphone whose major axis is directed toward a scene being photographed. As shown in FIG. 5, the cardioidal response pattern arises by reason of the addition of the output of the integration channel shown in FIG. 4 and the output of the addition channel. As indicated previously, the phases of the signals in these two channels is the same with the result that super-position applies. Considering a pair of omnidirectional microphone elements (i.e., $d_1=d_2$) such that the line connecting the elements lies along the axis "X" shown in FIG. 5, integration of the difference between the outputs of the two members will produce the figure-eight shown at 76 in FIG. 5. That is to say, the pair of omnidirectional elements act as a directional microphone when the output of the integration channel is considered by itself. The major axis of the figure-eight would coincide with the line X—X connecting the two omnidirectional microphones.

On the other hand, the two omnidirectional microphones would act as an omnidirectional receiver when the output of the addition channel is considered by itself and produce the spherical response shown at 78 in FIG. 5. Finally, the addition of the figure-eight pattern 76 (which arises from the integration of the difference between the output of the two microphones) to the circle pattern 78 (which arises from summing the outputs of the two microphones) will yield the cardioidal pattern 80 of FIG. 5 if the integrated signal and the sum signal are properly scaled.

The previously described microphone array and its processing provides a cardioidal response along the major axis of the array and with the null facing the camera. This is accomplished by means for summing the output of two receiving members or microphone elements (represented by adder 40 in FIG. 4), means for subtracting and then integrating the output of two elements (represented by subtractor 41 and integrator 42), and means for combining the outputs of the summing channel and the integrating channel, the combining means being represented by the adder 46 of FIG. 4. As regards the combining means, however, it is important to note that at least in some arrangements, it could include a subtractor rather than an adder or both of these. Such subtraction of the summed and integrated outputs reverses the direction along the array axis of the pattern. This is employed in some of the stereophonic arrays, later described in detail, with regard to FIGS. 15 and 16.

Additionally, since the output of the integrated channel alone provides a figure-eight response, a pair of arrays (rather than a single array) mounted at an angle to each other may be utilized for stereo to provide figure-eight pattern or two cardioid patterns, each directed along its own respective array. This arrangement is subsequently described with regards to FIG. 11.

Cardioid microphones may also be employed to produce excellent stereo patterns. These can be constructed in a conventional manner as cardioids or produced by the previously described processing of signals from omnidirectional microphones. In either case, once the cardioid microphone is achieved, they may be combined in two arrays at an angle to each other on the camera and their signals processed as later explained in detail in FIG. 14 for stereo, or also mounted in a single array transverse to the camera as in FIG. 16A and processed by both adding and subtracting the summed and integrated signals thereof to produce stereo reception.

Consequently, manipulation of the microphones in combination with appropriate signal processing means additionally permits the microphones to function as a stereo receiver having preselected separation between the channels as described below. Referring now to FIG. 11A, microphone assembly 100 includes a first array comprising a pair of microphones M(I) and M(II) that define a first array axis A—A, and a second array comprising a second pair of microphones M(II) and M(III) that define a second array axis B—B such that the two array axes intersect at an angle from 60-90 degrees. In array 100, microphone M(II) is common to both the first and second pair of microphones. In an alternate arrangement, the assembly 100' shown in FIG. 11F, provides microphone axes A—A and B—B intersecting at the same angle as that of FIG. 11A, but there is no commonality between the two pairs of microphones.

Signal processing means 101 shown in FIG. 11B is utilized with microphone assembly 100. Processing means 101 includes subtractor 102 for taking the difference between the outputs of the first array, that is, microphones M(I) and M(II) to obtain a difference signal which is integrated in integrator 103. The output of this integrator is an integrated signal associated with the first array or pair of microphones. Similar processing circuitry is present for operating on the outputs of the other array, that is, of microphones M(II) and M(III) thereby producing an integrated signal associated with the second array or pair of microphones. Since in this arrangement the output of one channel is the mirror image of the other, only one channel will be described in detail with the understanding that it applies equally well to the other.

When the microphones are omnidirectional, the response pattern of the first pair of microphones without processing is the circle 84 but with processing, that is based on the integrated signal derived therefrom, will be directional along the first array axis A—A. Specifically, the response pattern resulting from subtraction and integration will be a figure-eight as indicated by a curve 104 in FIG. 11C. Similarly, the response pattern of the second array of microphones without processing will be the circle 86 of FIG. 11B, and when based on the integrated signal derived therefrom, will be a figure-eight directed along the axis B—B. As a consequence, the integrated signal from the first pair of microphones will provide right channel information in a stereo system, while the integrated signal from the second pair of microphones will furnish left channel information.

When such a receiving system is incorporated into a movie camera to provide a stereo sound recording, some camera noise will be picked up in each of the two channels by reason of the figure-eight configuration of the response patterns. This pickup can be minimized by carrying out the additional signal processing, shown in FIG. 11E, as signal processing means 101' which, in addition to the circuitry shown in FIG. 11B, includes a pair of adders 105 and 105'. Adder 105 adds the outputs of microphones M(I) and M(II) to obtain a sum signal which is added to the integrated signal. The output of adder 105 is a first additionally processed signal associated with the first array, or first pair of microphones. Similarly, the same processing is carried out with respect to the second array or second pair of microphones to obtain a second additionally processed signal associated with the second pair of microphones.

The processing carried out by the signal processing means 101' shown in FIG. 11E, provided suitable gain parameters are provided between the sum signal and the integrated signal, will produce a cardioidal response pattern for each of the pairs of microphones. Thus, the response pattern of the first array of microphones based on the first processed signal is a cardioidal 96 shown in FIG. 11C, having its major axis A—A of cardioidal 96 along the first array axis A—A. Thus, the first additionally processed signal is associated with right channel information. Similarly, the second additionally processed signal, the cardioidal 98 in FIG. 11D, is associated with the left channel information.

As a consequence of utilizing the array shown in FIG. 11A or 11F, in combination with the signal processing means 101', a receiving system is defined which permits stereophonic recordings to be made. Preferably, the array axes intersect at an oblique angle, for example 90 degrees, to provide adequate separation between the left and right channels while still providing good reception from the front. When utilizing the just-described receiver system (employing omnidirectional microphones) with a camera for the purpose of making stereophonic sound recordings, with at least some rejection of camera noise, it is preferred to mount the microphone array directly above or below the camera. On the other hand, where cardioid microphones are employed, as subsequently described, the array is preferably mounted on a boom 92 that is attached to camera 94 (FIG. 12) and extends downwardly and forwardly from the front of the camera out of the field of view of the camera at about 20 degrees to the optical axis Z. The assembly of microphones preferably lies in a plane that is parallel to the optical axis Z.

When directional microphones are utilized in the assembly of FIG. 11A, rather than omnidirectional microphones as described above, the microphones are oriented as subsequently explained so that their major axes (the axes of their individual response patterns) which are designated by vector 108 in FIG. 14 are aligned with the camera boom 92. As previously noted, the term directional microphones includes an array of omnidirectional microphones signal processed as explained in regard to FIG. 4 to produce a directional response. Hence, in the arrangement shown in FIG. 14, each microphone "m" may be replaced by an array whose axis is aligned with vector 108.

The effect of utilizing directional microphones in a triangular array is to increase the directionality of the pairs of microphones as indicated in FIGS. 14C and 14D. Referring now to array 109 shown in FIG. 14A, cardioidal microphones m(I) and m(II) constitute a first array of microphones defining a first array axis A—A and m(II) and m(III) constitute a second array axis B—B. The major axis of the cardioidal response pattern of each of these microphones is rotated from its array axis. Preferably, when the assembly is to be utilized for stereophonic recordings in connection with a movie camera, the angle between arrays is about 90 degrees so that the axis A—A is about 45 degrees to the camera optical axis while the major axis of the initial cardioids of the microphones will be at about 45 degrees to the axis of their respective arrays or parallel to the camera axis. Hence, the microphone axes m(I) and m(II) are approximately 45 degrees to the array axis A—A and that of m(III) and m(II) also approximately 45 degrees to axis B—B.

A signal processing means 110 shown in FIG. 14B (substantially identical to that of FIG. 11B) causes the response pattern of the first pair of directional microphones m(I) and m(II), or at least a resulting main lobe, to be directed along the first array axis A—A about 45 degrees to the camera axis and the major axis 108 of the directional pattern of the two microphones. Specifically, signal processing means 110 includes a subtractor 102 for subtracting the outputs of microphones m(I) and m(II) to produce a difference signal which is integrated at 103 to produce a first integrated signal. The response pattern (of the first array of microphones) based on the first integrated signal has a main lobe 112 and minor lobe 111 as shown in FIG. 14C. A corresponding processing with respect to the outputs of microphones m(II) and m(III) also takes place in signal processing means 110 to produce a second integrated signal such that the response pattern (of the second array of microphones) based on the second integrated signal is directional along the second array axis B—B as indicated in FIG. 14D. When the microphone axes of array 109 intersect at 90 degrees, the major axes of the response patterns shown in FIGS. 14C and 14D will intersect at 90 degrees.

The secondary lobe 111 associated with the main lobe 112 of the response pattern shown in FIG. 14C has about half the amplitude of the main lobe. The presence of this secondary lobe will introduce some left channel information into the right channel which may not be desirable in some circumstances. Therefore, the array shown in FIGS. 15A or 16A can be utilized to improve the separation between the channels and to minimize the number of microphone elements required.

Figure 16A:
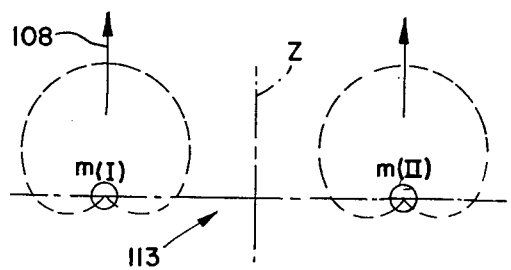
FIGS. 16A-C are concerned with a two-member cardioidal microphone arrangement and the processing by which such an arrangement will define a stereophonic receiver.

Referring first to FIG. 16A, array 113 comprises a single array of a pair of directional microphones m(I) and m(II) defining a microphone array axis A—A with the major axis 108 of the microphones, i.e., of their response pattern being directed toward the scene (parallel to the optical axis of the camera for sound photography) and, hence, perpendicular to axis A—A. Signal processing means 114 (shown in FIG. 16C) associated with array 113 includes subtractor 102 for subtracting the outputs of each of the microphones and producing a difference signal that is integrated at 103 to produce an integrated signal. The output of the two microphones are also applied to adder 105 which produces a sum signal that is applied in parallel to additional adder 116 and a subtractor 117. The integrated signal is also applied to the two last-mentioned components so that the output of adder 116 constitutes a first processed signal which is the sum of both the integrated signal and the sum of the outputs of the two microphones. On the other hand, the output of subtractor 117 is the difference between the integrated signal and the sum of the outputs of the two microphones. Hence, adder 116 and subtractor 117 together provide means for combining the sum and the integrated signal in this instance.

The response pattern of the pair of microphones based on the first processed signal is directional along the axis E—E which is about 45 degrees to both the microphone axis 108 and the array axis A—A. Similarly, the response pattern of the array based on the second processed signal is directed along a second axis F—F which is 90 degrees displaced from the first axis.

Figure 16B:
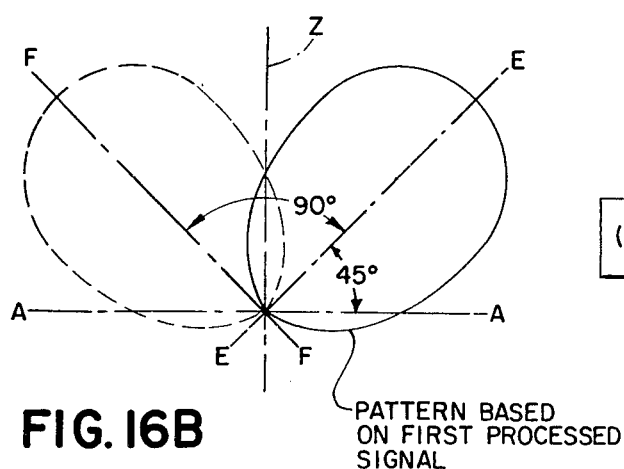

The shape of the response pattern as shown in FIG. 16B is somewhat circular although the patterns are elongated along their respective axes E—E and F—F. The shape and elongation of the pattern will depend upon the relative gain as between the integrated signal produced by integrator 103 and the gain of the sum signal produced by adder 115. The degree of separation between the two channels is achieved by adjusting the relative gains as between the integrated signal and the sum channel.

Figure 16C:
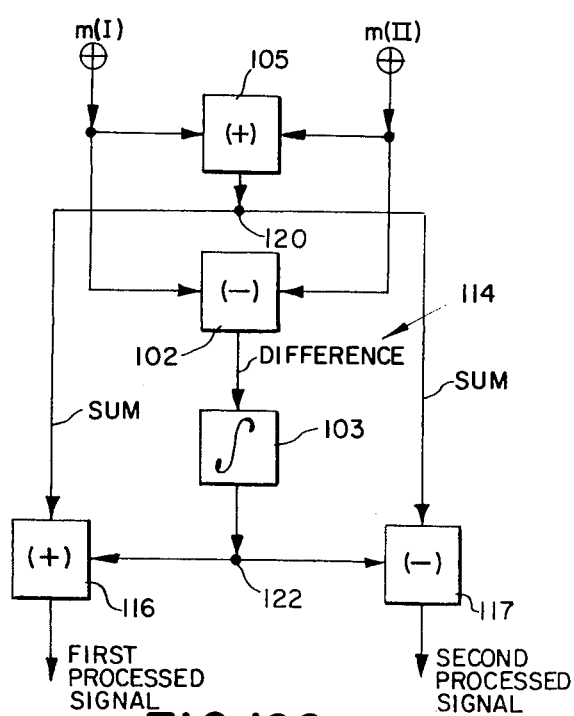

Thus, a gain control (not shown) may be incorporated with or following adder 105, just before the branch point 120 of its output, and a second gain control (not shown) may be incorporated with or following integrator 103 just before its branch point 122. Then, adjustment of these gain controls alters the pattern shape and hence rotates its main axis from the 45 degree angle achieved with substantially equal gain. Hence, while in the case of the arrays of FIGS. 11 and 14, the separation of the left and right channel is determined by the angle of intersection of the two arrays, the separation in the case of the arrays of FIG. 16 is altered by the gain control. Specifically, the separation may be enhanced by reducing the gain of the sum signal from adder 105 versus the gain of the integration signal from integrator 103 in FIG. 16C.

Alternately, individual gain controls would be provided in each of the dual outputs of the adder 105 and the integrator 103, that is, a pair of gain controls following branch point 120 and also following branch point 122.

Figure 15A:
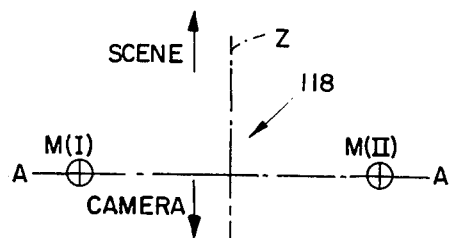
FIGS. 15A-B are concerned with a two-member array of omnidirectional microphones whose output can be processed to provide a stereophonic receiver.
Figure 15B:
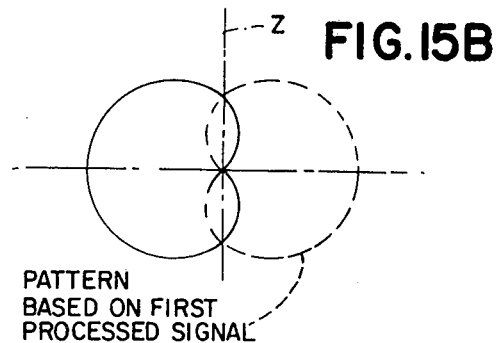

If the directional microphones are replaced by omnidirectional microphones, as in FIG. 15A, oppositely directed cardioids result when processed in accordance with that shown in FIG. 16C. Referring now to FIG. 15A, array 118 comprises a pair of omnidirectional microphones M(I) and M(II) defining microphone axis A—A. If this array were used with a camera for recording sound, axis A—A would be oriented like that of FIG. 16A in a direction perpendicular to the optical axis Z of the camera and a signal processing means like that shown in FIG. 16C is used. As a consequence of the manner in which the two processed signals are obtained, the patterns based on these signals are cardioidal with their major axes aligned with the array axis A—A but 180 degrees apart as indicated in FIG. 15B.

While many different types of microphones, both omnidirectional and cardioidal, are commercially available, a microphone 120 shown in FIG. 13A is particularly well adapted to produce an array similar to that shown in FIG. 11F. Prior to explaining the use in an array, the microphone structure will be explained. The microphone 120 comprises a tubular sleeve 121, whose axial ends 122 and 123 are open to admit sound, and a diaphragm 124 centrally mounted within the housing 121 as shown in FIG. 13A. Because sound can enter forwardly and rearwardly of the diaphragm, a mechanical subtraction process is achieved with this diaphragm, thus eliminating the need for two separate microphones or a subtractor when utilizing the signal processing circuitry as shown in FIG. 11D or 11E. For example, a pair of microphones 120 may be utilized in the assembly 100″ of FIG. 13B. Hence, in essence, each single microphone 120 replaces two of the microphones of assembly 100′ and the subtractor. Specifically, the two microphones are oriented so that their axes intersect providing the arrangement shown in FIG. 13B. The output of each of these microphones 120 is applied to an integrator whose output will be an integrated signal that is equivalent to the integrated signal described in regard to FIG. 11B, but without utilizing a separate electrical subtraction process.

Figure 17:
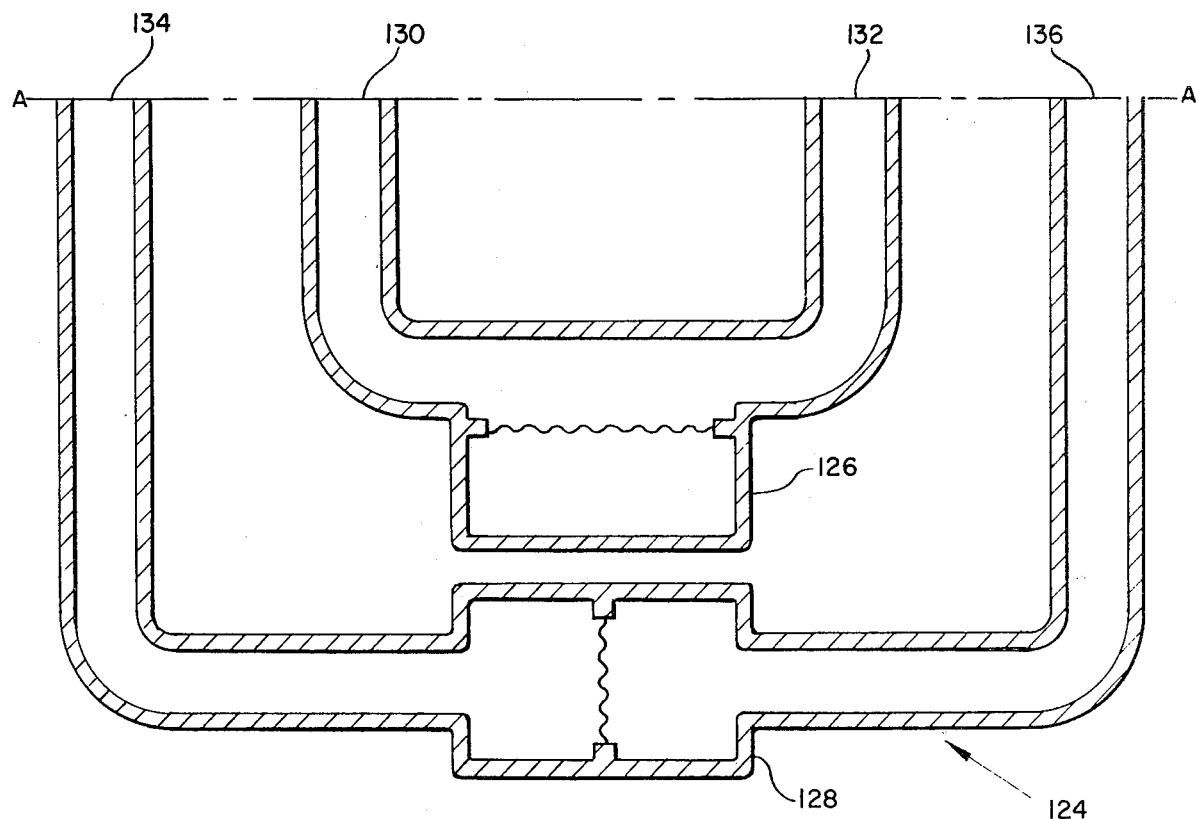
FIG. 17 illustrates an alternate embodiment of a microphone array providing addition and subtraction of respective pairs of microphone inputs achieved by mechanical rather than electrical arrangements.

Turning now to FIG. 17 which illustrates an array 124 formed of two microphones, 126 and 128 which respectively provide addition and subtraction of their input signals by means of their physical construction rather than the electrical processing previously described. In this arrangement, microphone 126 is a conventional pressure microphone having a pair of receiving members or inputs 130 and 132 arranged along the array axis A—A. On the other hand, microphone 128 is similar to that shown in FIG. 13A, but with its receiving members or inputs 134 and 136 extended to the axis A—A only outboard of the inputs 130 and 132.

A mechanical member or linkage (not shown) supports the microphones 126 and 128 in this manner with their receiving inputs aligned along axis A—A such that the inputs 130 and 132 in conjunction with microphone 126 operate in a manner equivalent to the microphone pair M2 and M3 and adder 40 of FIG. 4 while inputs 134 and 136 operate as M1, M2 and subtractor 41 of FIG. 4. Further, the description of the spacing of the microphones noted for FIGS. 1–10 will similarly apply to the spacing of the inputs 132 to 136.

Consequently, if the output of microphone 128 is integrated and added to the output of microphone 126, the response patterns described with respect to FIGS. 1–10 will be achieved. That is, if the output of the adder microphone 126 is applied to the gain control 45 of FIG. 4 and the output of subtractor microphone 128 is applied to the integrator 42 of this figure, the resulting signal from adder 46 will be a cardioid as previously described. Hence, it should be understood that in some circumstances, the physical structure of the microphones themselves may provide means, such as microphone 126, for adding the output signals from the receiving members 130 and 132 to produce a sum signal and means, such as microphone 128, for subtracting the output signals of receiving members 134 and 136 to produce a difference signal.

It is of course desirable that the difference in sound transit time (from input to diaphragm) in microphones 126 and 128 be small, for example, less than 20% of the transit time between the respective inputs thereof, e.g., between input 132 and 136. This difference in transit time can be minimized by making the distance between the input and the diaphragm equal in both microphones or by inserting an acoustic delay in either. Additionally, an electronic delay can be provided in the output of either microphone.

In a three microphone stereo system (FIG. 11B using omni-directional microphone elements or FIG. 13B using cardioidal microphone elements), wind noise is sometimes a problem; and under some conditions, it is desirable to provide circuitry for minimizing the effect of such noise. Basically, wind is an uncorrelated phenomenon at each microphone element of the array with the result that the instantaneous pressure due to wind at each element is uncorrelated and cannot be cancelled by the subtraction operation in the signal processing system. Furthermore, the integration operation carried out in each channel of a stereo system described above will effectively produce changes in amplitude inversely related to frequency. That is to say, the amplitude of low frequency sounds is accentuated.

It has been found that wind noise is in the range less than 2,000 Hz with the result that under some field conditions, wind noise will detract from information whose recording is desired. The present invention minimizes the effect of such noise by suppressing low frequency components of the integrated signal to produce a filtered integrated signal containing substantially only the higher frequency information of the sound to be recorded, suppressing high frequency components in the output of at least one of the elements of the microphone array to produce a filtered output signal containing wind noise and the lower frequency information components of the sound scene, and then adding the two filtered signals to produce a resultant signal. The low frequency components in the left and right output channels are thus derived from the same microphone element and are thus monaural sounds presented in each channel. Such sounds are present without being amplified as much as would be the case were differences in these low frequency signals integrated. Thus, directionality of low frequency signals is degraded. However, the higher frequency components in the two channels are well separated in accordance with the directional characteristics achieved by the integration of the difference signals.

This arrangement will achieve pleasing results in the presence of strong wind noise during the stereophonic recording of a sound scene. Where the cutoff frequency of the high pass filter associated with the integrated signal, and the low pass filter associated with the individual microphone elements is of the order of magnitude of about 1 KHz, the improved results might be explained as follows: above about 1 KHz, differences in amplitude appear to be the factor that enables the human ear to directionally discriminate sounds while below about 1 KHz, differences in phase (time delay) dominate directional discrimination. In a small cluster of microphone elements, the interelemental spacing is many times smaller than the wavelength of low frequency information and noise sounds so that the microphone cluster is not as effective in providing directional information as in the case of information sounds at frequencies greater than 1 KHz. Therefore, relatively little loss in directional information results from the above-described process.

Figure 18:
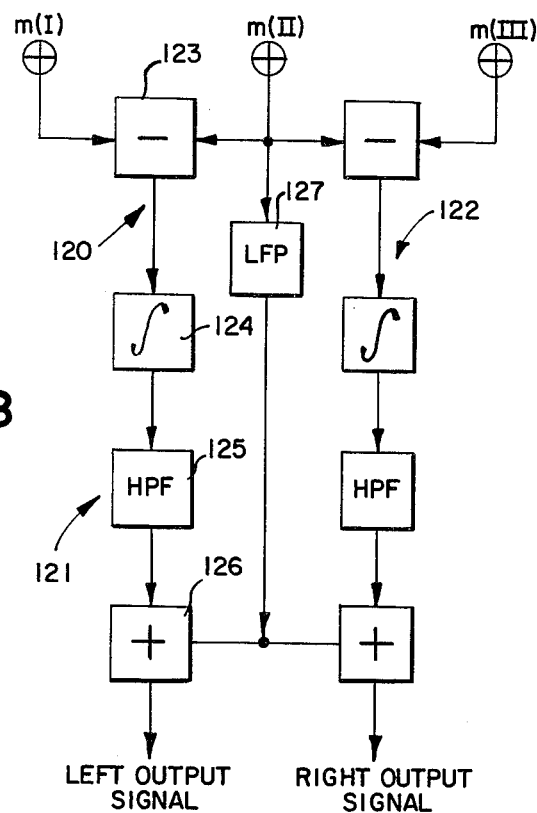
FIG. 18 is a block diagram of signal-processing equipment suitable for carrying out the signal-processing technique of the present invention in a manner that minimizes wind noise for microphone systems of the type shown in FIGS. 11A or 14A.
Figure 19:
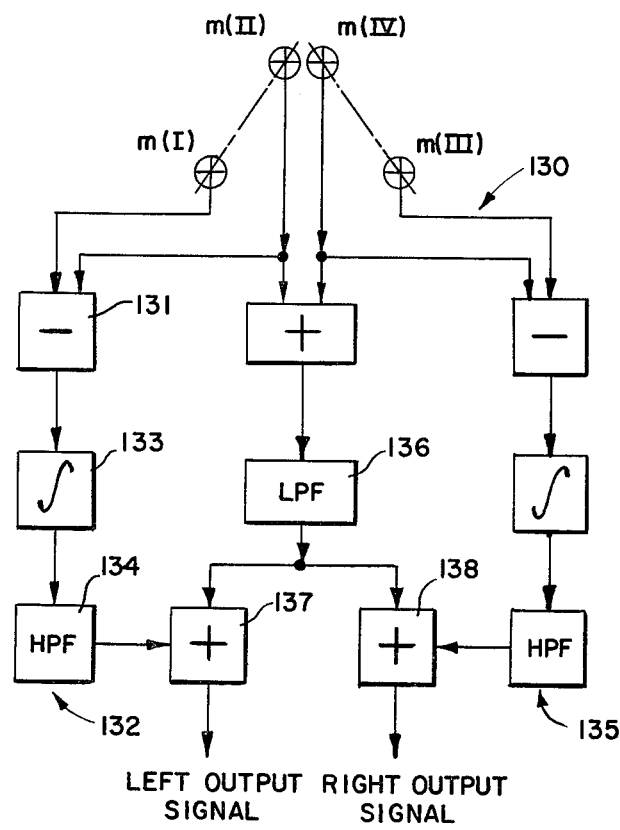
FIG. 19 is a block diagram showing signal-processing equipment for minimizing wind noise when the microphone array is of the type shown in FIG. 11F.
Figure 20:
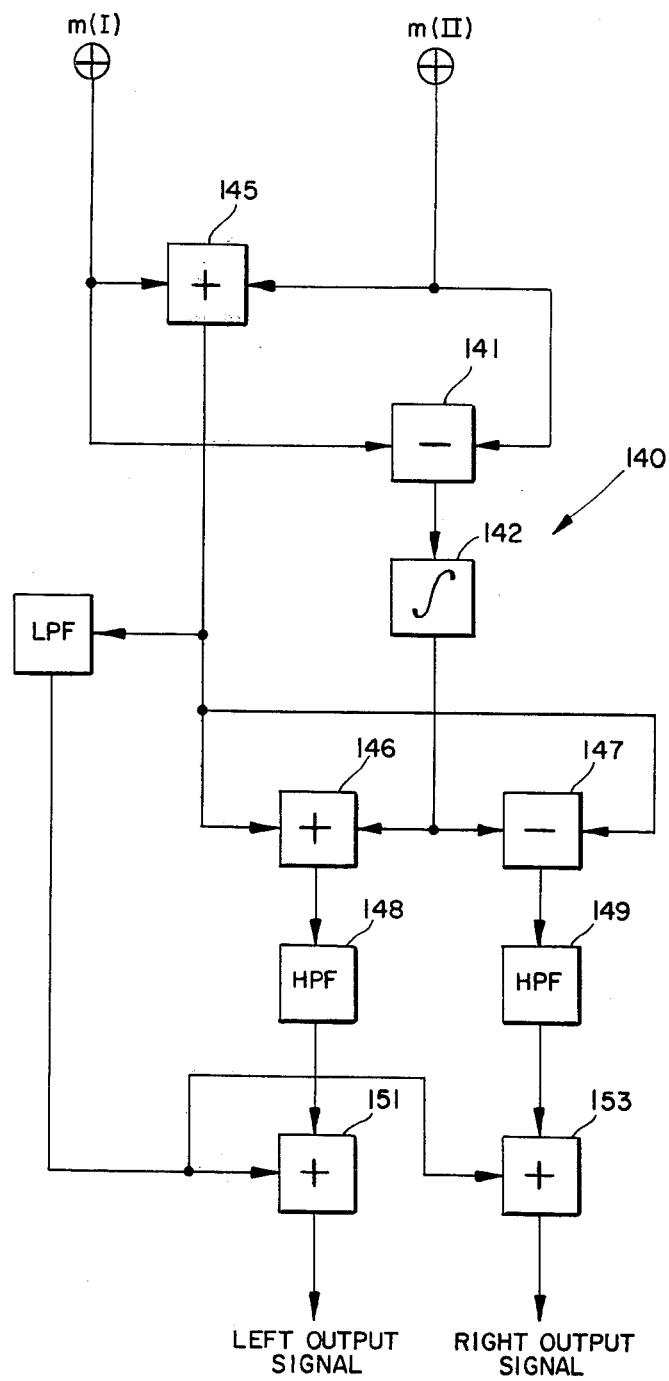
FIG. 20 is a block diagram showing signal-processing equipment for minimizing wind noise for a microphone array of the type shown in FIGS. 15A and 16A.

Circuitry for reducing the effect of wind noise in a stereo system according to the present invention are shown in FIGS. 18–20 to which reference is now made. As shown in FIG. 18, microphones m(I), m(II) and m(III) can be arranged as shown in FIG. 11A or 14A for producing output signals in response to incident sound. Specifically, the three microphone elements are arranged in a triangle whose apex is directed toward the scene being photographed, and lies along the taking axis of the camera as shown in FIG. 12. Signal processing means 120 associated with the three microphones has left channel 121 and right channel 122 for processing the output signals. Each channel includes a subtraction circuit 123 for taking the difference between the output signals of an adjacent pair of elements to produce a difference signal. In addition, each channel also includes integrator 124 for integrating the difference signal to produce an integrated signal. The integrated signal is applied to a high pass filter 125 which has a cutoff frequency in the range 400–2,000 Hz producing a filtered integrated signal. The latter is applied to an adder circuit 126 to which is also applied the output of the leading microphone m(II) after the output signal of this microphone is passed through low pass filter 127 to obtain a filtered output signal. As a consequence of this arrangement, low frequency components of the integrated signal in each channel 121 and 122 are suppressed while substantially equal amounts of low frequency components of sound picked up by element m(II) are passed to each of the left and right output channels. Thus, low frequency sounds are monaural, while high frequency sounds will be stereophonically recorded.

Preferably, the cutoff frequency of each of filters 125 and 127 is the same. Such cutoff frequency can be in the range 400–2,000 Hz, the particular cutoff frequency being dependent in large measure on the type of filters employed. The more steep are the skirts of these filters, the higher the cutoff frequency can be in the range indicated. For example, with a two-pole filter, the preferred cutoff frequency is approximately 600 Hz.

When the microphone array is as shown in FIG. 11F, signal processing circuitry 130 as shown in FIG. 19 can be utilized for the purpose of reducing the effect of wind noise. The circuitry shown in FIG. 19 is similar to that shown in FIG. 18 in the sense that subtractor 131 in left channel 132 provides a difference signal subtracting the outputs of microphone elements m(I) and m(II). The difference signal is applied to integrator 133 to provide an integrated signal that is applied to high pass filter 134 which produces a filtered integration signal. A corresponding operation occurs in right output channel 135 with respect to the outlets of microphones m(III) and m(IV).

The outputs of one or more of the microphone elements are applied to low pass filter 136 for providing a filtered output which is combined with adder 137 to provide the left output signal and to adder 138 which provides the right output signal. As in the case of circuitry 120, the relationship between the cutoff frequencies of the low and high pass filters is the same.

Circuitry for reducing the effect of wind noise, for the microphone array shown in FIG. 15A or 16A, is illustrated in FIG. 20. Signal processing circuit 140 includes subtractor 141 which subtracts the output of microphone elements m(I) and m(II) to provide a difference signal that is integrated by circuit 142 to produce an integrated difference signal. The output of m(I) and m(II) are also added by an adder 145 whose output is, in turn, combined with the integrated difference signal by means of an adder 146 and a subtractor 147 to produce left and right information channels. These channel outputs are, in turn, applied to separate high pass filters 148 and 149 to produce a filtered integration signal of each channel. Finally, the output of the adder 145 is also passed through a low pass filter 150 whose output is then added, by adders 151 and 153, to the filtered integration signal in each channel to provide the monaural low frequency input thereto.

In each of the above, it should be noted that the high pass filtering is applied in each only after the left and right channel information has been determined to thereby avoid distortions which could be caused by combining separately filtered directional information. Hence, it can be seen that the above arrangements provide means for combining the outputs of a plurality of microphone receivers to produce separate channels having directional information, for integrating with time the signals of each channel, for filtering low frequencies from each channel, and for then combining with each channel the low frequency output of at least one receiver.

It is believed that the advantages and improved results furnished by the method and apparatus of the present invention are apparent from the foregoing description of the several embodiments of the invention. Various changes and modifications may be made without departing from the spirit and scope of the invention as sought to be defined in the claims that follow.

What is claimed is:

1. A receiving system comprising a plurality of spaced apart receiving means for producing a time varying output signal responsive to incident time-variable stimuli, and signal processing means for combining the output signals from the receiving means to produce a selected response pattern for the stimuli, the improvement wherein the signal processing means includes a difference channel for subtracting the output signals of a pair of the receiving means to obtain a difference signal, and an integrating channel for integrating the difference signal with respect to time to obtain an integrated difference signal thereby imposing a figure eight response on the response characterized by the inputs to the difference channel.

2. A receiving system having a plurality of spaced apart receiving members, each of which is responsive to incident time-variable stimuli for producing a corresponding time-variable output signal, and signal processing means for combining the output signals from the receiving members to produce a selected response pattern for the stimuli, the signal processing means including means for subtracting the output signals of a pair of members to obtain a difference signal, the improvement wherein said signal processing means includes:
   an integrating channel for integrating the difference signal with respect to time to obtain an integrated difference signal;
   a summing channel for adding the output signals of a pair of the members to obtain a sum signal; and
   combining means for combining the outputs of the summing and integrating channels.

3. A receiving system according to claim 2 wherein the combining means includes means for adding the outputs of the summing and integrating channels.

4. A receiving system according to claim 2 wherein said combining means includes means for subtracting the outputs of the summing and integrating channels.

5. A receiving system according to claim 4 wherein said combining means further includes means for also adding the outputs of the summing and integrating channels.

6. A receiving system according to claim 2 wherein the combining means includes gain control means for setting the gain of at least one of said channels relative to the other.

7. A receiving system according to claim 2 wherein there are four aligned receiving members, the members whose outputs are added in the sum channel to form the sum signal being intermediate the members whose outputs are subtracted to form the difference signal.

8. A receiving system comprising:
a plurality of receiving members, each of which is responsive to incident time-variable stimuli for producing a corresponding time-variable output signal; and
signal processing means for combining the output signals from the receiving members to produce a selected response for stimuli at preselected values of frequency and angles of incidence, said signal processing means including:
a summing channel for adding the output signals of a pair of the members to obtain a sum signal;
a difference channel for subtracting the output signals of a pair of members to obtain a difference signal;
an integrating channel for integrating the difference signal with respect to time to obtain an integrated difference signal; and
combining means for combining the outputs of the summing and integrating channels.

9. A receiving system according to claim 8 wherein the combining means includes gain control means for setting the gain of one channel relative to the other to define a gain controlled integrated signal and a gain controlled sum signal, and means for adding the two gain controlled signals.

10. A receiving system according to claim 9 wherein the relative gain of the gain controlled signals is selected such that the output of the combining means approaches zero for incident stimuli at low frequencies making a predetermined angle with the axis of the array.

11. A receiving system according to claim 9 wherein the members are laterally spaced in an elongated array and the relative gain of the gain controlled signals is selected such that the output of the combining means approaches zero for incident stimuli at low frequencies and oriented in a given direction with the array.

12. A receiving system according to claim 8 wherein the plurality of members includes four receiving members, the members whose outputs are added in the sum channel to form the sum signal being intermediate the members whose outputs are subtracted to form the difference signal.

13. A receiving system according to claim 11 wherein the receiving members are microphones and the incident stimuli is sound having a component in the audio range.

14. A receiving system according to claim 13 in combination with the noise source and mounting means for mounting the microphone oriented with respect to the noise source such that the receiving system rejects noise from the source.

15. A receiving system according to claim 8 wherein the array includes two receiving members whose outputs are added to obtain the sum signal and whose outputs are subtracted to obtain the difference signal.

16. In a receiving system having a plurality of receiving members arranged in an array with each member being responsive to incident time-variable stimuli for producing a corresponding time-variable output signal, the improvement comprising signal processing means for combining the output signals from the receiving members to create a cardioidal-like response over a band of frequencies of the stimuli, said signal processing means including:
a summing channel for adding the output signals of a pair of members to obtain a sum signal;
means for subtracting the output signals of a pair of the members to obtain a difference signal;
an integrating channel for integrating the difference signals with respect to time to obtain an integrated different signal; and
combining means for combining the outputs of the summing and integrating channels.

17. The improvement of claim 16 wherein the combining means includes gain control means for setting the gain of one channel relative to the other to define a gain controlled integrated signal and a gain controlled sum signal, and means for adding the two gain controlled signals.

18. A sound photographic system comprising:
a camera having a lens assembly with a predetermined field of view which defines the camera taking axis, said camera during its operation providing sound extending over a given range of frequencies; and
a sound recording apparatus associated with said camera, said sound apparatus comprising:
an array of microphones fixed to said camera outside of said predetermined field of view such that said camera sound is oriented at a predetermined angle of incidence to said array; and
means for spacing the microphones in said array and for combining the output signals thereof so that array preferentially rejects sound from said camera when the latter is made operative, said spacing and combining means includes means for subtracting the output signals of a pair of said microphones to obtain a difference signal, and an integrating channel for integrating said difference signal with respect to time.

19. The sound photographic system of claim 18 wherein said microphones are ominidirectional microphones and in combination with said spacing and combining means provide a cardioidal response having its area of maximum rejection of said range of camera sound frequencies located at said predetermined angle of incidence.

20. A sound receiving system for use with a camera having a lens assembly with a predetermined field of view which defines the camera taking axis, said camera during its operation providing camera sound extending over a given range of frequencies, said sound system comprising:
an array of spaced microphones;
means for mounting said array on said camera outside of said predetermined field of view such that said camera sound is oriented at a predetermined angle of incidence to said array;

means for combining the output signals of said microphones so that said array preferentially rejects sound from said camera when the latter is made operative, said combining means including:

means for subtracting the output signals of a pair of said microphones to obtain a difference signal; and an integrating channel for integrating said difference signal with respect to time.

21. A sound receiving system according to claim 20 additionally including:

a summing channel for adding the output signals of a pair of microphones to obtain a sum signal; and means for combining the outputs of said summing and said integrating channels.

22. A sound receiving system according to claim 21 wherein said combining means includes means for adding the outputs of said summing and integrating channels.

23. A sound receiving system according to claim 21 wherein said combining means includes means for subtracting the outputs of said summing and integrating channels.

24. A sound receiving system according to claim 21 wherein said combining means further includes means for also adding the outputs of said summing and integrating channels.

25. A sound receiving system according to claim 21 wherein said combining means includes gain control means for setting the gain of one channel relative to the other to define a gain controlled integrated signal and a gain controlled sum signal, and said combining means comprises means for adding the two gain controlled signals.

26. A sound receiving system according to claim 25 wherein the relative gain of said gain controlled signals is selected such that the output of said combining means approaches zero for low frequency sound incident on said array at said predetermined angle, and the lateral spacing between said microphones is selected to provide an equal amplitude of both gain controlled signals for a given frequency incident at said predetermined angle.

27. A sound receiving system according to claim 21 wherein said microphones are provided in two arrays at an angle to each other, the respective microphones of each array are subtracted and integrated with time to produce first and second integration signals, and the respective microphones of each are summed to produce first and second summed signals respectively, and said combining means includes means for combining the first integration signal with the first summed signal to produce a first stereo channel and the second integration signal with the second summed signal to provide a second stereo channel.

28. A sound receiving system according to claim 21 wherein said array includes four microphones, the microphones whose outputs are added in summing channel to form said sum signal being intermediate the microphones whose outputs are subtracted to form said difference signal.

29. A sound receiving system according to claim 28 wherein said four microphones are spaced generally side by side in a plane.

30. A sound receiving system according to claim 28 wherein the distance between said intermediate microphones is approximately one-half the distance between the outer microphones of said array.

31. A sound receiving system according to claim 28 wherein said combining means includes gain control means for setting the gain of one channel relative to the other, and said gain control means and the lateral spacing of said microphones in said array are selected to provide an equal amplitude of both gain controlled signals for a frequency of approximately 8,000 Hz incident on said array at said predetermined angle.

32. A sound receiving system according to claim 31 accomodating a range of frequencies extending from low frequencies up to approximately 6,000 Hz.

33. A receiving system having a preselected response pattern for incident sound comprising a plurality of microphones, each of which produces a time variable output signal in response to incident time variable sounds, at least a pair of said microphones being arranged in a first array defining a first array axis; and signal processing means for integrating with time the difference between the output signals of the microphones of the first array to provide a first integrated signal.

34. A receiving system according to claim 33 wherein the microphones are omnidirectional, and the signal processing means causes the response pattern of the first pair of microphones to be directional along the first array axis.

35. A receiving system according to claim 33 including a second array having a second pair of directional microphones, each of whose major axis is parallel to the major axes of the first pair of microphones, the second pair of microphones defining a second array axis, and wherein the signal processing means includes means for integrating the difference between the output signals of the second pair of microphones to obtain a second integrated signal whereby the response pattern of the second pair of microphones is directional along the second array axis.

36. A receiving system according to claim 35 wherein the signal processing means includes means for adding the output of the microphones of the first array to obtain a first sum signal and for adding the outputs of the microphones of the second array to obtain a second sum signal, and means for adding the first sum signal to the first integrated signal to obtain a first processed signal and for adding the second sum signal to the second integrated signal to obtain a second processed signal whereby the response pattern of the first array of microphones is a generally cardioidal pattern directed along the axis of the first array and the response pattern of the second array of microphones is a generally cardioidal pattern directed along the axis of the second array.

37. A receiving system according to claim 36 wherein the two microphone axes intersect and one microphone is common to both, the first and second array.

38. A sound receiving system comprising at least a pair of microphone arrangements laterally spaced in a first array and defining a first array axis, the microphone arrangements each including means for producing a direction response along parallel microphone axes which are oblique to the first array axis, and signal processing means for integrating with time the difference between the outputs of the microphone arrangements of the array to provide a first integration signal providing a response pattern rotated from the microphone axes.

39. A sound receiving system according to claim 38 wherein said processing means includes means for adding the outputs of the pair of microphone arrangements to produce a first sum signal and means for combining the first sum signal with the first integration signal.

40. A sound receiving system according to claim 39 wherein said combining means includes means for adding the first sum signal and the first integration signal to produce a first stereo channel and means for subtracting the first sum signal and the integration signal to produce a second stereo channel.

41. A sound receiving system according to claim 38 including a second array having at least a pair of second microphone arrangements laterally spaced in a second array and defining a second array axis at an oblique angle to the first array axis, the second microphone arrangements each including means for producing a directional response along parallel microphone axes which are oblique to the axis of the second array, said second array being arranged at an angle to said first array, and the processing means includes means for integrating with time the difference between the output signal of the microphone arrangements of the second array to provide a second integration signal providing a response pattern rotated from the microphone axis, said first integrated signal providing a first stereo channel directed generally along the first array axis, and said second integration signal providing a second stereo channel directed generally along the second array axis.

42. A sound receiving system according to claim 41 wherein the two array axes intersect and wherein one microphone is common to both the first and second array of microphones.

43. A sound receiving system according to claim 41 wherein the axes of the first and second array are located at an angle of about 90° to each other, wherein the major axis of each microphone is about 45° to the axis of its respective array.

44. A sound receiving system according to claim 41 wherein the signal processing means includes means for summing the outputs of the first pair of microphones to form a sum signal, and means for adding the sum signal to the first integrated signal to obtain a first processed signal, and for subtracting the sum signal from the first integrated signal to obtain a second processed signal, whereby the response pattern of the microphones based on the first processed signal is directional along a first axis about 45° to the first microphone axis and the response pattern of the microphones based on the second processed signal is directed along a second axis 90° to the first axis.

45. A receiving system comprising a first and second microphone arrangement laterally spaced apart to define an array axis, said microphone arrangements including means for producing a cardioid-like response directed at an oblique angle to the array axis, and means for subtracting the outputs of the microphone arrangements and for integrating the difference with time to obtain an integration signal thereby altering the response pattern of each microphone arrangement and rotating their major axes with respect to the array axis.

46. The system of claim 45 including means for adding the outputs of each microphone arrangement to produce a sum signal, means for adding the sum signal and the integration signal to produce a first stereo channel and means for subtracting the sum signal and the integration signal to produce a second stereo channel.

47. A sound receiving system comprising:
(a) an array of microphone elements for producing output signals in response to incident sound;
(b) signal processing means for providing the array with pre-selected directional acceptance and rejection characteristics including:
  (1) means for integrating the difference between the output signals of a pair of elements to produce an integrated signal;
  (2) a high pass filter for suppressing lower frequency components of the integrated signal to produce a filtered integration signal;
  (3) a low pass filter for suppressing high frequency components in the output signal of at least one of the elements to produce a filtered output signal; and
  (4) means for adding the filtered integrated signal to the filtered output signal.

48. A sound receiving system according to claim 47 wherein the cutoff frequency of the filters is in the range 400–2,000 Hz.

49. A sound receiving system comprising:
(a) an array of microphone elements for producing output signals in response to incident sound;
(b) signal processing means having a left and right output channel for processing the output signal;
(c) means in each channel for integrating the difference between the output signals of an adjacent pair of elements to produce an integrated signal;
(d) means responsive to the integrated signal in each channel for producing left and right output signals representing sound originating in front of and respectively to the left and right of the array; and
(e) frequency responsive means for suppressing low frequency components of the integrated signal in each channel and for passing substantially equal amounts of low frequency components of sound picked up by the elements to each of the left and right output signals.

50. A sound receiving system according to claim 49 wherein the array comprises a triangular array of at least three elements, the apex of the triangular array being directed toward the sound source, and each output channel including means to subtract the outputs of a pair of elements which consists of a lead element and a trailing element for forming a difference signal, means for integrating the difference signal to produce an integrated signal, and a high pass filter for filtering the integrated signal to form a filtered integrated signal.

51. A sound receiving system according to claim 50 including a low pass filter for filtering the output of at least one of the elements to produce a filtered output signal and means in each channel for adding the filtered integrated signal in the channel to the filtered output signal.

52. A sound receiving system according to claim 51 wherein the array consists of three elements arranged in a triangle.

53. A sound receiving system according to claim 52 wherein the array consists of four elements with two of the elements at substantially at the apex of a triangle.

54. A sound receiving system according to claim 49 wherein the low frequency cutoff is in the range 400–2,000 Hz.

55. A sound receiving system according to claim 54 wherein the low frequency cutoff is less than 1,000 Hz.

56. A sound receiving system according to claim 55 wherein the low frequency cutoff is less than 500 Hz.

57. A sound receiving system according to claim 49 wherein the array comprises two elements arranged in a line perpendicular to the sound source, and the signal processing means includes:
  (a) means to add the outputs of the elements to produce a sum signal;
  (b) a low pass filter for filtering the sum signal to produce a filtered sum signal;
  (c) means to subtract the outputs of the elements to produce a difference signal;
  (d) means to integrate the difference signal to produce an integrated signal;
  (e) means to add the integrated signal to the sum signal to provide one combined signal;
  (f) means to subtract the integrated signal from the sum signal to provide another combined signal;
  (g) a high pass filter for filtering the one combined signal;
  (h) a high pass filter for filtering the other combined signal;
  (i) an adder for adding the filtered sum signal to the filtered one combined signal for producing a first processed signal; and
  (j) an adder for adding the filtered sum signal to the filtered other combined signal for producing a second processed signal.

58. A sound photographic system comprising:
  (a) a camera having a lens assembly with a predetermined field of view which defines the camera-taking axis;
  (b) sound recording apparatus associated with said camera and comprising:
    (1) three microphone elements arranged in a triangle whose apex is directed toward the scene being photographed and lies along the taking axis, each element producing an output signal in response to incident sound;
    (2) a low pass filter for passing low frequency components of the output signal of one of the elements for providing a filtered output signal;
    (3) left and right output channels, each having means to subtract the output signal of the lead element from a different trailing element to produce two difference signals;
    (4) an integrator in each channel for integrating the difference signals therein to provide an integrated signal;
    (5) a high pass filter in each channel for filtering low frequency components from the integrated signal in the channel to provide a filtered integrated signal; and
    (6) an adder in each channel for adding the filtered output signal therein to the filtered integrated signal in the channel to provide left and right output signals.

59. A sound photographic system according to 58 wherein the low pass filter suppresses signals greater than 2,000 Hz and the high pass filter suppresses signals less than 400 Hz.

60. A sound photographic system according to 58 wherein the cutoff frequency of the filters is substantially the same, and is in the range 400–2,000 Hz.

* * * * *